(12) United States Patent
Wang et al.

(10) Patent No.: US 12,554,004 B2
(45) Date of Patent: Feb. 17, 2026

(54) BACKSCATTER-BASED POSITIONING

(71) Applicant: QUALCOMM Incorporated, San Diego, CA (US)

(72) Inventors: Xiaojie Wang, Hillsborough, NJ (US); Jing Sun, San Diego, CA (US); Mohammad Tarek Fahim, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/073,496

(22) Filed: Dec. 1, 2022

(65) Prior Publication Data

US 2024/0183971 A1 Jun. 6, 2024

(51) Int. Cl.
*G01S 13/76* (2006.01)
*H04W 64/00* (2009.01)

(52) U.S. Cl.
CPC ......... *G01S 13/765* (2013.01); *H04W 64/003* (2013.01)

(58) Field of Classification Search
CPC .... G01S 13/765; G01S 5/0236; G01S 5/0009; G01S 13/751; H04W 64/003
See application file for complete search history.

(56) References Cited

U.S. PATENT DOCUMENTS

| | | | |
|---|---|---|---|
| 11,520,001 B1 * | 12/2022 | Al-Mahdawi | G01S 5/06 |
| 2024/0163840 A1 * | 5/2024 | Säily | H04L 25/0222 |
| 2024/0179494 A1 * | 5/2024 | Säily | H04W 4/029 |
| 2025/0126572 A1 * | 4/2025 | Cui | H04B 17/318 |

FOREIGN PATENT DOCUMENTS

| | | | |
|---|---|---|---|
| WO | WO-2021197218 A1 * | 10/2021 | |
| WO | WO-2022199785 A1 | 9/2022 | |
| WO | WO-2022200673 A1 | 9/2022 | |

OTHER PUBLICATIONS

International Search Report and Written Opinion—PCT/US2023/076080—ISA/EPO—Apr. 12, 2024 (2300673WO).
Partial International Search Report—PCT/US2023/076080—ISA/EPO—Feb. 22, 2024 (2300673WVO).

* cited by examiner

*Primary Examiner* — Umair Ahsan
(74) *Attorney, Agent, or Firm* — QUALCOMM Incorporated

(57) ABSTRACT

This disclosure provides systems, methods, and devices for wireless communication that support backscatter-based positioning. In a first aspect, a method of wireless communication includes transmitting a tag configuration message that indicates a first tag configuration and a second tag configuration. The method also includes transmitting a positioning reference signal (PRS). The method also includes receiving, from a first tag device, a first backscatter signal based on the PRS, and receiving, from a second tag device, a second backscatter signal based on the PRS. The method includes transmitting a measurement report that indicates a first round trip time (RTT) of the first tag device, and a second RTT of the second tag device. The first RTT is based on the first tag configuration and the first backscatter signal, and the second RTT is based on the second tag configuration and the second backscatter signal.

18 Claims, 11 Drawing Sheets

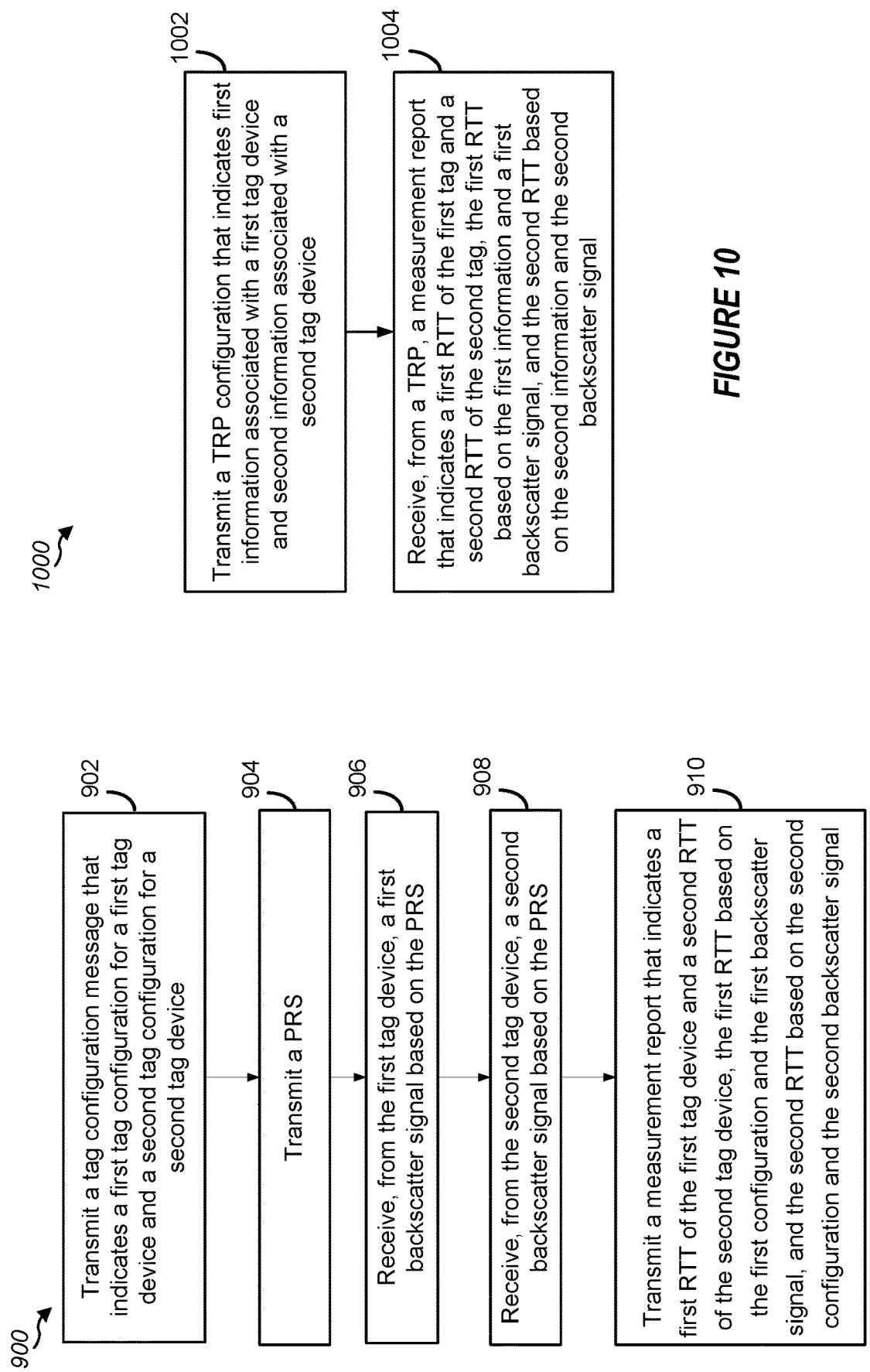

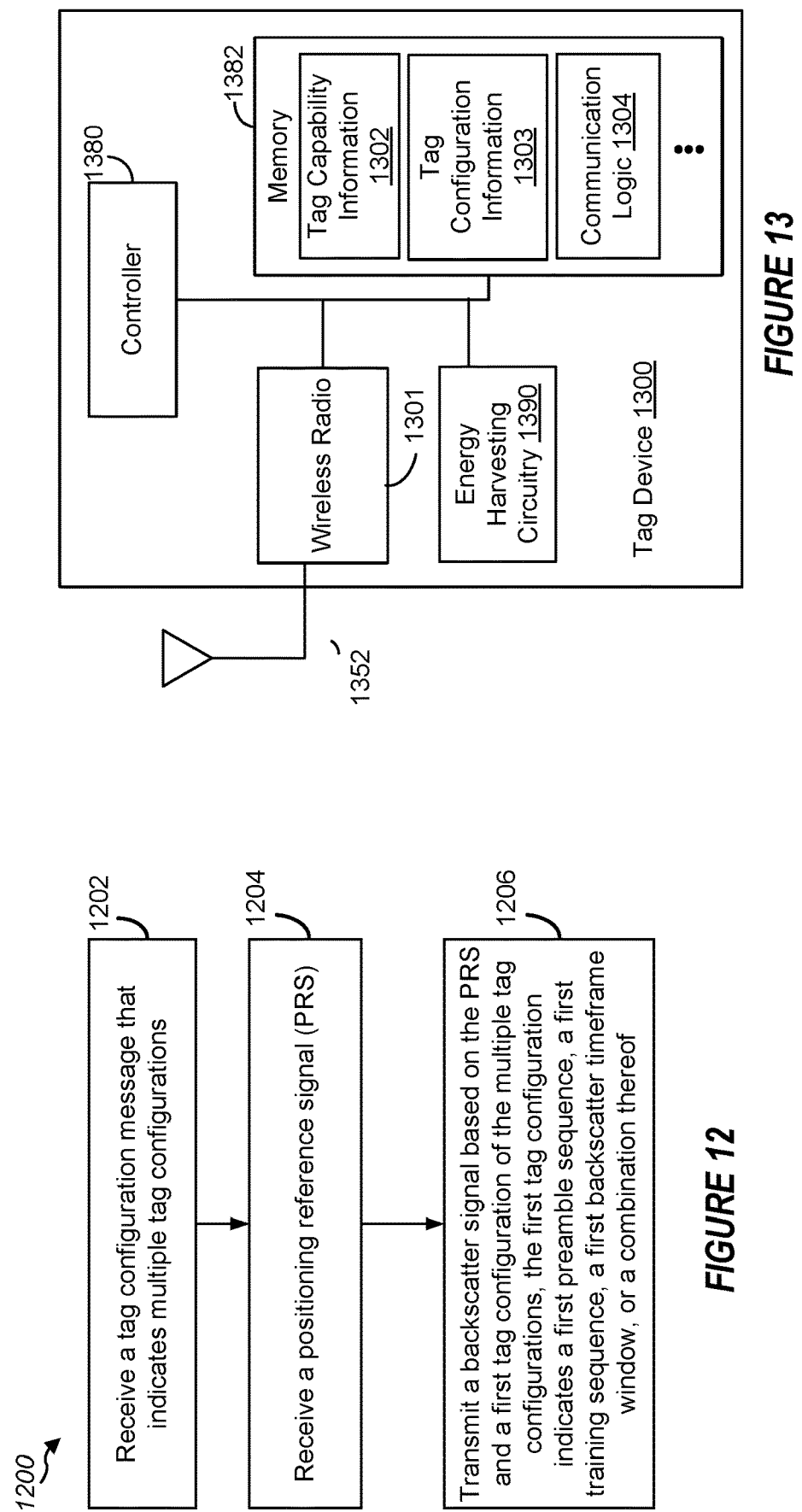

BACKSCATTER-BASED POSITIONING

TECHNICAL FIELD

Aspects of the present disclosure relate generally to wireless communication systems, and more particularly, to backscatter-based positioning. Some features may enable and provide improved communications, including reduced control overhead, efficient resource utilization, improved network access, improved ranging measurements, location determinations, TRP selection, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Radio frequency identification (RFID) systems and devices typically include a reading device, called a reader, and one or more tag devices—e.g., RFID tag devices. A tag device typically includes a wireless microchip used to tag an object for automated identification. However, the use of tag devices has not been has not been applied to current 3GPP technologies and Internet-of-Things (IOT) implementations that may include identification, monitoring, positioning, and tracking, as illustrative, non-limiting examples. Additionally, tag devices can vary in individual capacities and components. Accordingly, use of tag devices applied to current 3GPP technologies, such as coexistence with user equipments (UEs), and infrastructure in frequency bands for current 3GPP technologies has yet to be established. Given the low power and limited processing capabilities of different types of tag devices, incorporation of tag devices with 3GPP technologies presents a variety of complex and technical challenges, such as limiting network congestion, overhead, and interference associated with the use of tag devices with 3GPP technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a network entity. The method includes transmitting a tag configuration message that indicates a first tag configuration and a second tag configuration. The method also includes transmitting a positioning reference signal (PRS). The method also includes receiving, from a first tag device, a first backscatter signal based on the PRS, and receiving, from a second tag device, a second backscatter signal based on the PRS. The method includes transmitting a measurement report that indicates a first round trip time (RTT) of the first tag device, and a second RTT of the second tag device. The first RTT is based on the first tag configuration and the first backscatter signal, and the second RTT is based on the second tag configuration and the second backscatter signal.

In an additional aspect of the disclosure, an apparatus includes at least one processor and a memory coupled to the at least one processor. The at least one processor is configured to transmit a tag configuration message that indicates a first tag configuration and a second tag configuration. The at least one processor is further configured to transmit a PRS. The at least one processor is also configured to receive, from a first tag device, a first backscatter signal based on the PRS, and receive, from a second tag device, a second backscatter signal based on the PRS. The at least one processor is configured to transmit a measurement report that indicates a first RTT of the first tag device, and a second RTT of the second tag device. The first RTT is based on the first tag configuration and the first backscatter signal, and the second RTT is based on the second tag configuration and the second backscatter signal.

In an additional aspect of the disclosure, an apparatus includes a communication interface configured to transmit a tag configuration message that indicates a first tag configuration and a second tag configuration. The communication interface is also configured to transmit a PRS. The communication interface is further configured to receive, from a first tag device, a first backscatter signal based on the PRS, and receive, from a second tag device, a second backscatter signal based on the PRS. The apparatus further includes at least one processor coupled to a memory storing processor-readable code, the at least one processor configured to execute the processor-readable code to cause the at least one processor to generate a measurement report that indicates a first RTT of the first tag device, and a second RTT of the second tag device. The first RTT is based on the first tag configuration and the first backscatter signal, and the second RTT is based on the second tag configuration and the second backscatter signal.

In an additional aspect of the disclosure, an apparatus includes means for transmitting a tag configuration message that indicates a first tag configuration and a second tag configuration. The apparatus further includes means for transmitting a PRS. The apparatus further includes means for receiving, from a first tag device, a first backscatter signal based on the PRS, and means for receiving, from a second tag device, a second backscatter signal based on the PRS. The apparatus includes means for transmitting a measurement report that indicates a first RTT of the first tag device, and a second RTT of the second tag device. The first RTT is based on the first tag configuration and the first backscatter signal, and the second RTT is based on the second tag configuration and the second backscatter signal.

In an additional aspect of the disclosure, a non-transitory computer-readable medium stores instructions that, when executed by a processor, cause the processor to perform operations. The operations include transmitting a tag configuration message that indicates a first tag configuration and a second tag configuration. The operations further include transmitting a PRS. The operations also include receiving, from a first tag device, a first backscatter signal based on the PRS, and receiving, from a second tag device, a second backscatter signal based on the PRS. The operations include transmitting a measurement report that indicates a first RTT of the first tag device, and a second RTT of the second tag device. The first RTT is based on the first tag configuration and the first backscatter signal, and the second RTT is based on the second tag configuration and the second backscatter signal.

In an additional aspect of the disclosure, a method for wireless communication is performed by a network entity. The method includes transmitting a transmission/reception point (TRP) configuration that indicates first information associated with a first tag device, and second information associated with a second tag device. The first information indicates a first position of the first tag device, a first training sequence for the first tag device, a first backscatter timeframe window for the first tag device, or a combination thereof. The second information indicates a second position of a second tag device, a second training sequence for the second tag device, a second backscatter timeframe window for the second tag device, or a combination thereof. The method also includes receiving, from a TRP, a measurement report that indicates a first RTT of a first tag device, and a second RTT of a second tag device. The first RTT is based on the first information and a first backscatter signal, and the second RTT is based on the second information and a second backscatter signal.

In an additional aspect of the disclosure, an apparatus includes at least one processor and a memory coupled to the at least one processor. The at least one processor is configured to transmit a TRP configuration that indicates first information associated with a first tag device, and second information associated with a second tag device. The first information indicates a first position of the first tag device, a first training sequence for the first tag device, a first backscatter timeframe window for the first tag device, or a combination thereof. The second information indicates a second position of a second tag device, a second training sequence for the second tag device, a second backscatter timeframe window for the second tag device, or a combination thereof. The at least one processor is further configured to receive, from a TRP, a measurement report that indicates a first RTT of a first tag device, and a second RTT of a second tag device. The first RTT is based on the first information and a first backscatter signal, and the second RTT is based on the second information and a second backscatter signal.

In an additional aspect of the disclosure, an apparatus includes at least one processor coupled to a memory storing processor-readable code, the at least one processor configured to execute the processor-readable code to cause the at least one processor to generate a TRP configuration that indicates first information associated with a first tag device, and second information associated with a second tag device. The first information indicates a first position of the first tag device, a first training sequence for the first tag device, a first backscatter timeframe window for the first tag device, or a combination thereof. The second information indicates a second position of a second tag device, a second training sequence for the second tag device, a second backscatter timeframe window for the second tag device, or a combination thereof. The apparatus further includes a communication interface configured to transmit the TRP configuration, and receive, from a TRP, a measurement report that indicates a first RTT of a first tag device, and a second RTT of a second tag device. The first RTT is based on the first information and a first backscatter signal, and the second RTT is based on the second information and a second backscatter signal.

In an additional aspect of the disclosure, an apparatus includes means for transmitting a TRP configuration that indicates first information associated with a first tag device, and second information associated with a second tag device. The first information indicates a first position of the first tag device, a first training sequence for the first tag device, a first backscatter timeframe window for the first tag device, or a combination thereof. The second information indicates a second position of a second tag device, a second training sequence for the second tag device, a second backscatter timeframe window for the second tag device, or a combination thereof. The apparatus further includes means for receiving, from a TRP, a measurement report that indicates a first RTT of a first tag device, and a second RTT of a second tag device. The first RTT is based on the first information and a first backscatter signal, and the second RTT is based on the second information and a second backscatter signal.

In an additional aspect of the disclosure, a non-transitory computer-readable medium stores instructions that, when executed by a processor, cause the processor to perform operations. The operations include transmitting a TRP configuration that indicates first information associated with a first tag device, and second information associated with a second tag device. The first information indicates a first position of the first tag device, a first training sequence for the first tag device, a first backscatter timeframe window for the first tag device, or a combination thereof. The second information indicates a second position of a second tag device, a second training sequence for the second tag device, a second backscatter timeframe window for the second tag device, or a combination thereof. The operations further include receiving, from a TRP, a measurement report that indicates a first RTT of a first tag device, and a second RTT of a second tag device. The first RTT is based on the first information and a first backscatter signal, and the second RTT is based on the second information and a second backscatter signal.

In an additional aspect of the disclosure, a method for wireless communication is performed by a tag device. The method includes receiving a tag configuration message that indicates multiple tag configurations, and receiving a PRS.

The method also includes transmitting a backscatter signal based on the PRS and a first tag configuration of the multiple tag configurations. The first tag configuration indicates a first preamble sequence, a first training sequence, a first backscatter timeframe window, or a combination thereof.

In an additional aspect of the disclosure, an apparatus includes at least one processor and a memory coupled to the at least one processor. The at least one processor is configured to receive a tag configuration message that indicates multiple tag configurations, and receive a PRS. The at least one processor is further configured to transmit a backscatter signal based on the PRS and a first tag configuration of the multiple tag configurations. The first tag configuration indicates a first preamble sequence, a first training sequence, a first backscatter timeframe window, or a combination thereof.

In an additional aspect of the disclosure, an apparatus includes at least one processor coupled to a memory storing processor-readable code, the at least one processor configured to execute the processor-readable code to cause the at least one processor to identify a first tag configuration of multiple tag configuration indicated by a tag configuration message. The apparatus further includes a communication interface configured to receive a PRS, and transmit a backscatter signal based on the PRS and the first tag configuration. The first tag configuration indicates a first preamble sequence, a first training sequence, a first backscatter timeframe window, or a combination thereof.

In an additional aspect of the disclosure, an apparatus includes means for receiving a tag configuration message that indicates multiple tag configurations, and means for receiving a PRS. The apparatus further includes means for transmitting a backscatter signal based on the PRS and a first tag configuration of the multiple tag configurations. The first tag configuration indicates a first preamble sequence, a first training sequence, a first backscatter timeframe window, or a combination thereof.

In an additional aspect of the disclosure, a non-transitory computer-readable medium stores instructions that, when executed by a processor, cause the processor to perform operations. The operations include receiving a tag configuration message that indicates multiple tag configurations, and receiving a PRS. The operations further include transmitting a backscatter signal based on the PRS and a first tag configuration of the multiple tag configurations. The first tag configuration indicates a first preamble sequence, a first training sequence, a first backscatter timeframe window, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports backscatter-based positioning according to one or more aspects.

FIG. 10 is a flow diagram illustrating an example process that supports backscatter-based positioning according to one or more aspects.

FIG. 12 is a flow diagram illustrating an example process that supports backscatter-based positioning according to one or more aspects.

FIG. 13 is a block diagram of an example tag device that supports backscatter-based positioning according to one or more aspects.

Like reference numbers and designations in the various drawings indicate like elements.

DETAILED DESCRIPTION

Figure 1:
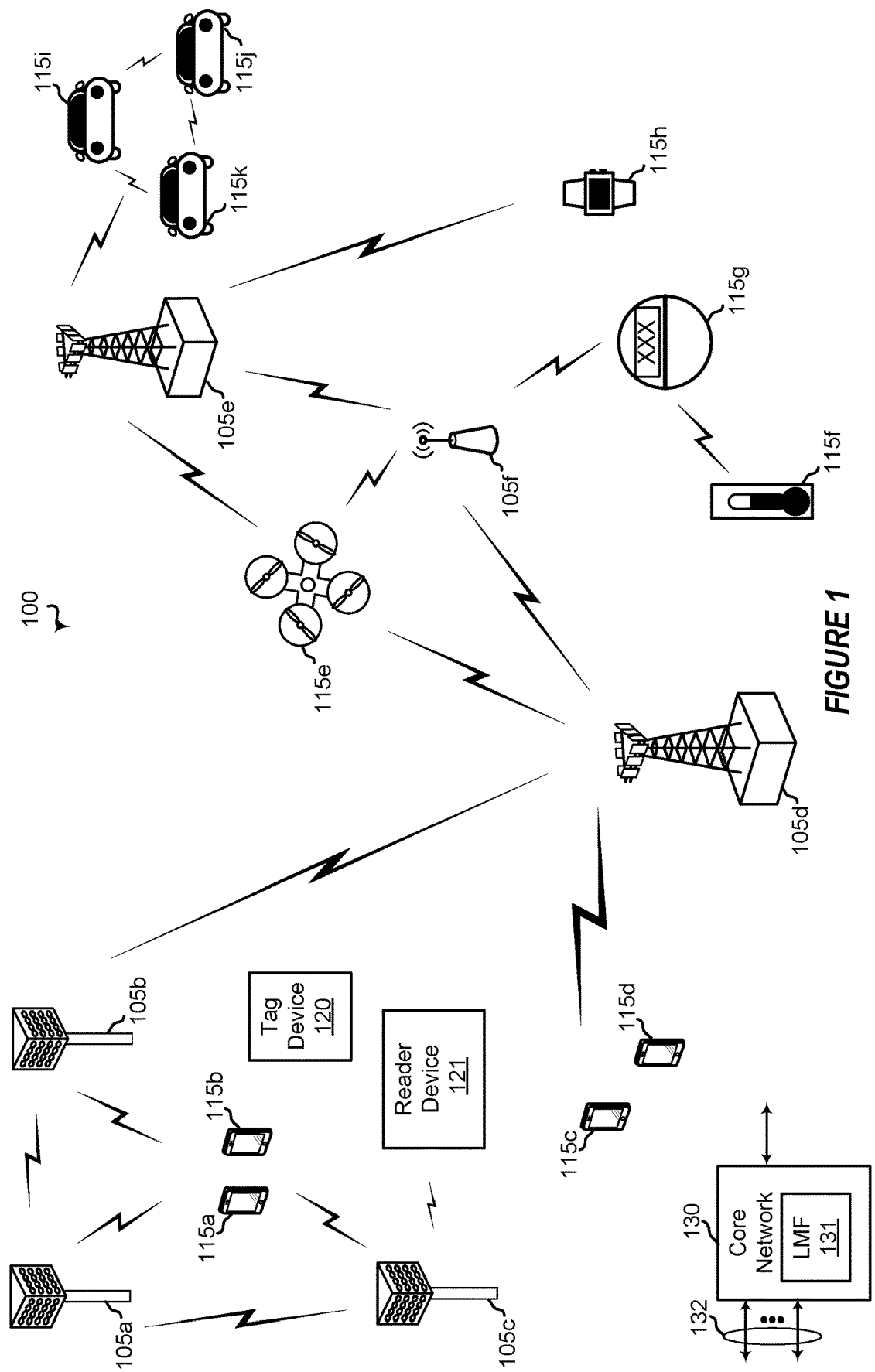
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support backscatter-based. For example, the present disclosure describes positioning of a tag device, such as a passive Internet-of-Things (IOT) device, through backscatter transmission. A location management function (LMF) of a core network may be configured to determine a position, such as a two-dimensional position or a three-dimensional position, of a tag device based on one or more measurement reports received from one or more transmission/reception points (TRPs). To illustrate, the LMF may identify a tag device, such as a passive tag device or a semi-passive tag device, for positioning and configure multiple TRPs for a tag device positioning session. For example, the LMF may configured one or more TRPs to send a respective positioning reference signal (PRS) and receive a respective backscatter signal. In some implementation, each of the one or more TRPs is configurable for full-duplex operation, are asynchronous, or a combination thereof.

In some implementations, the LMF transmits, to a TRP, a TRP configuration that indicates first information associated with a first tag device, and second information associated with a second tag device. For example, the first information may include or indicate a first position (e.g., a first estimated position) of the first tag device, and the second information may include or indicate a second position (e.g., a second estimated position) of the second tag device. Additionally, or alternatively, the first information may include or indicate a first training sequence or a first backscatter timeframe window for the first tag device, and the second information may include or indicate a second training sequence or a second backscatter timeframe window for the second tag device. The TRP receives the TRP configuration and generates a tag configuration message that indicates a first tag configuration and a second tag configuration. For example, the first tag configuration may indicate a tag address, a frequency shift parameter, a phase scrambling parameter, a first preamble sequence, a first training sequence, a first backscatter timeframe window, or a combination thereof. The TRP transmits a PRS and receives, in response to the PRS, a first backscatter signal from the first tag device, and the second backscatter signal from a second tag device. For example, the first tag device may transmit the first backscatter signal based on the PRS and the first tag configuration. The TRP generates and transmits, to the LMF, a measurement report that indicates a first RTT of the first tag device, and a second RTT of the second tag device. The first RTT is based on the first tag configuration and the first backscatter signal, and the second RTT is based on the second tag configuration and the second backscatter signal. The LMF may determine a position of the first tag device or the second tag device based on the measurement report.

Particular implementations of the subject matter described in this disclosure may be implemented to realize one or more of the following potential advantages or benefits. In some aspects, the present disclosure provides techniques for supporting backscatter-based positioning. The techniques described facilitate determining a position, such as a two dimensional or a three dimensional position, of a tag device that has limited on-board power and computational resources, such as a passive tag device or a semi-passive tag device.

In particular, the disclosure facilitates determination of a position, such as a two dimensional or a three-dimensional position, of one or more tag devices subject to the computational and power constraints of passive and semi-passive tag devices. For example, by providing a tag configuration message that indicates a first tag configuration and a second tag configuration, the TRP configures each of a plurality of tag devices such that, in response to a PRS transmitted by the TRP, the tag devices generate and transmit backscatter signals having patterns, such as a preamble sequence, a training sequence, a backscatter timeframe window, or a combination of these, to distinguish among backscatter signals received at the TRP from a plurality of tag devices. Additionally, the TRP is configurable to apply different techniques, that depend upon a distance of the tag devices from the TRP, to differentiate backscatter signals received from a plurality of tag devices. For example, if a group of tag devices are roughly equidistant from the TRP, the TRP is likely to receive backscatter signals from the tag devices roughly simultaneously. Accordingly, the TRP may distinguish among the received backscatter signals by configuring the tag devices to include training sequence patterns in the backscatter signals that are unique for each tag device. Alternatively, if one or more tag devices in a group of tag devices are of differing distances away from the TRP, then the TRP may configure the tag devices to provide backscatter signals over differing backscatter timeframe windows. For instance, a TRP may configure a first tag device that is at a further distance from the TRP than a second tag device to emit the backscatter signal over a longer backscatter timeframe window than a second tag device that is nearer to the TRP to account for possible attenuation to the backscatter signal due to the greater distance. Additionally, or alternatively, the disclosed techniques may processes backscatter signals from tag devices that are in a first group in which the tag devices are within a target range to the TRP and in a second group in which each the tag devices may differ in their distance to the TRP. Accordingly, in this manner, the techniques facilitate determination, by the TRP, of an RTT to and from a plurality of tag devices, thereby facilitating determination of positions of the plurality of tag devices.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network, for example may implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Tag device systems typically include a tag device 120 and a reader device 121. Tag device 120 includes radio frequency identification (RFID) device or tags that include a wireless microchip used for tagging objects for automated object identification. Reader device 121, such as an RFID reader, may be configured to transmit electromagnetic signals to other devices, such as tag device 120. Reader device 121 may include one or more processors and a memory and is typically able to process data. Additionally, reader device 121 usually includes one or more transmitters and receivers. During typical operation, reader device 121 may be configured to transmit a signal, which is receivable by tag device 120 and to receive and process a signal from tag device 120 that is responsive to the transmitted signal.

Tag devices, such as tag device 120, are categorized based on functionality or capability. For instance, tag device 120 may be categorized as one of a passive tag, a semi-passive tag, and an active tag depending on the functionality or capabilities of tag device 120. Accordingly, tag device 120 may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, reader device 121 may transmit an electromagnetic signal that a passive tag, such as tag device 120, may receive and at least partially reflect in the form of a backscatter signal. To elaborate, if tag device 120 is a passive tag then tag device 120 may include circuitry to at least partially reflect non-absorbed portions of electromagnetic signals received from the ambient environment, such as transmitted by reader device 121, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Active tags often include an on-board power source and more computational capacity than passive or semi-passive tags. Moreover, unlike passive and semi-passive tags that normally are unable to transmit unless a reader device, such as reader device 121, is in proximity to them, active tags are able to transmit regardless of a proximity of a reader device. Active tag devices typically include signal processing functionality, such as ADCs, DACs, and the like. Moreover, active tags often include a power source and are able to actively transmit. In particular, unlike passive and semi-passive tags that generate a backscatter signal by at least partially reflecting a transmission received from a reader device (e.g., reader device 121), active tags are capable of transmitting independently of a signal received from another device, such as reader device 121.

Additionally, tag devices, such as tag device 120, typically include a tag identification to uniquely identify the tag device. Accordingly, a tag device, such as tag device 120, may include its unique tag identification in response to receipt, at the tag device, of a transmission from reader device 121. If tag device 120 corresponds to a passive tag or a semi-passive tag, tag device 120 may be configured to at least partially reflect the transmission received from reader device 121 in the form of a backscatter signal that is readable by reader device 121. While an active tag is able to process a transmitted signal received from reader device 121, in some implementations, an active tag device may also partially reflect the received signal as a backscatter signal or may independently transmit a signal to reader device 121 in response to a signal received from reader device 121.

Tag device systems that include tag device 120 and reader device 121 may be deployed for positioning an object associated with tag device 120. For instance, tag device 120 may be affixed to an object, and reader device 121 may be configured to identify a position (e.g., a two-dimensional position, a three-dimensional position) of the object to which tag device 120 is affixed through use of backscatter-based positioning. As such, tag device systems can be deployed in a wide range of applications in which precise and accurate object positioning achieved. These applications may include automated checkout, medical application such as monitoring patients' compliance with medical directives, and law enforcement and security applications, as illustrative, non-limiting examples.

Figure 2:
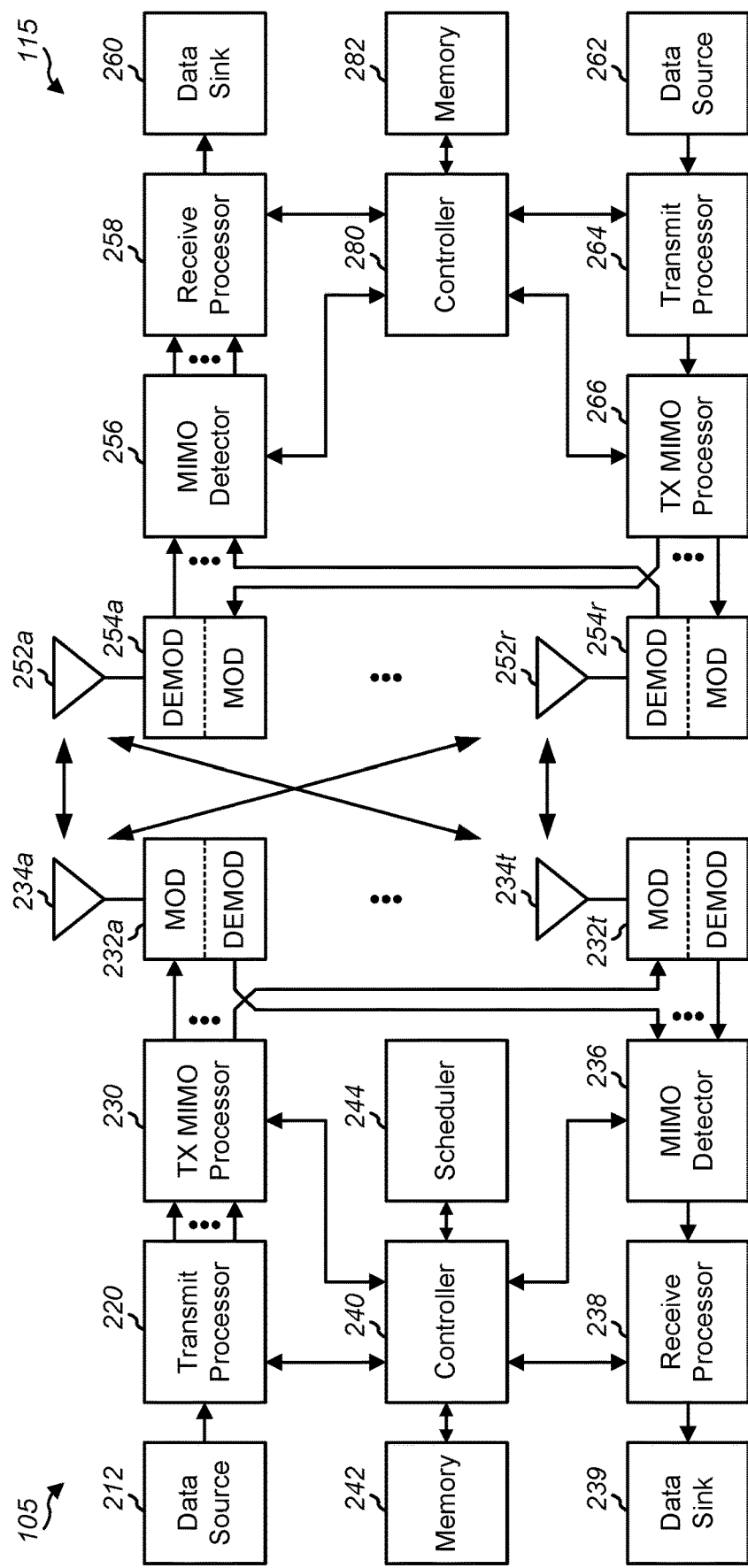
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105$f$ in FIG. 1, and UE 115 may be UE 115$c$ or 115$d$ operating in a service area of base station 105$f$, which in order to access small cell base station 105$f$, would be included in a list of accessible UEs for small cell base station 105$f$. Base station 105 may also be a base station of some other type. As shown in FIG. 2, base station 105 may be equipped with antennas 234$a$ through 234$t$, and UE 115 may be equipped with antennas 252$a$ through 252$r$ for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 9, 10, or 12, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
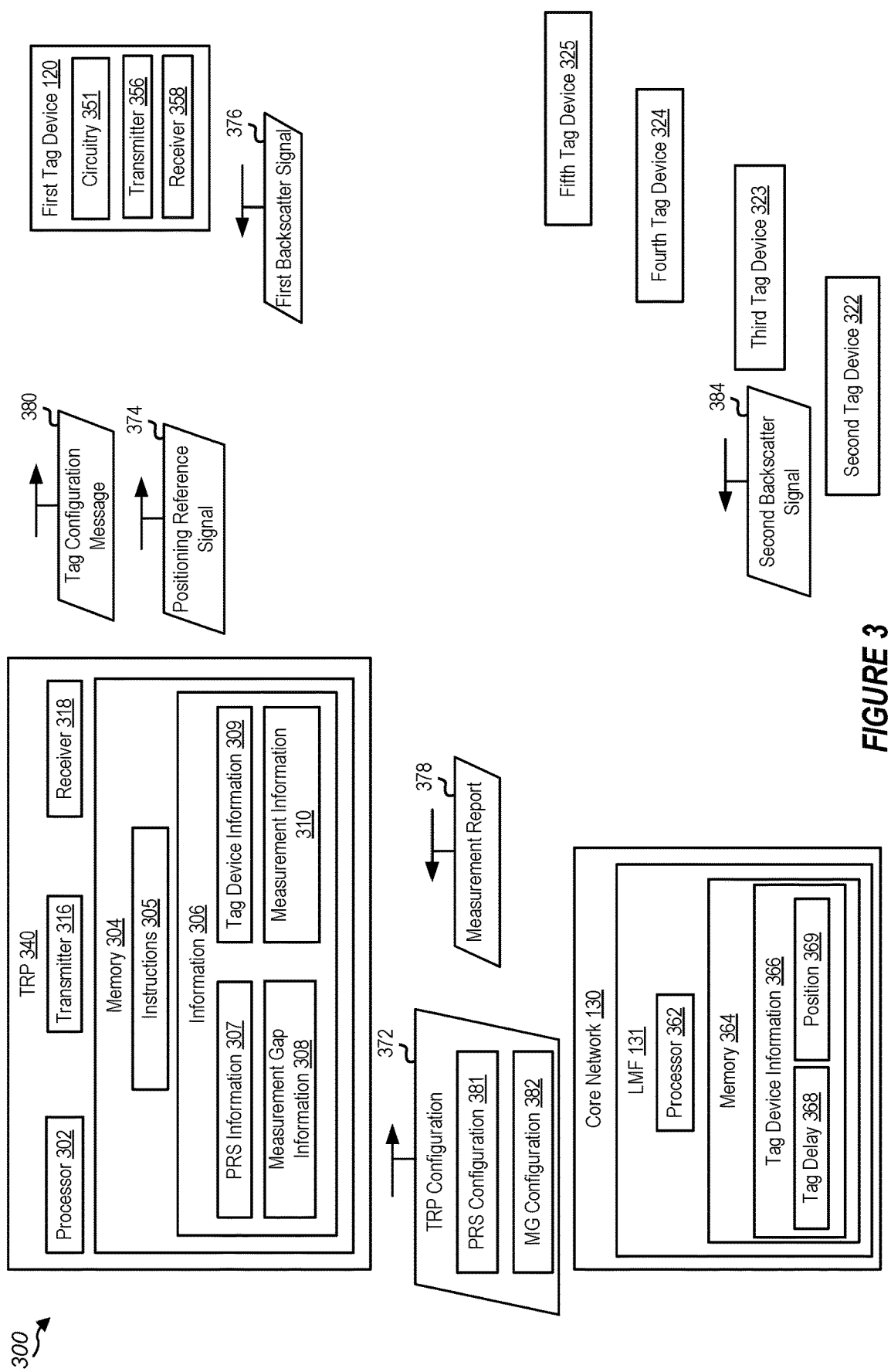
FIG. 3 is a block diagram illustrating an example wireless communication system that supports backscatter-based positioning according to one or more aspects.

FIG. 3 is a block diagram of an example wireless communications system 300 that supports backscatter-based positioning according to one or more aspects. In some examples, wireless communications system 300 may implement aspects of wireless network 100. Wireless communications system 300 includes core network 130, TRP 340, first tag device 120, second tag device 322, third tag device 323, fourth tag device 324, and fifth tag device 325. Although five tag devices are illustrated, in some other implementations, wireless communications system 300 may generally include fewer or more than five TRPs.

Tag device 120 may be a RFID tag device, as an illustrative, non-limiting example. Additionally, or alternatively, tag device 120 may be a passive tag having no power source and limited computational capacity, a semi-passive tag having a limited power source and computational capacity that is equal to or more extensive than the computational capacity of a passive tag device, or an active tag, having a power source and the same or more extensive computational capacity as that the semi-passive tag device.

Tag device 120 may include a variety of components (such as structural, hardware components) used for carrying out one or more functions described herein. For example, these components may include circuitry 351, transmitter 356, and receiver 358. Circuitry 351 may include or correspond to energy harvesting circuitry, a microcontroller, one or more processors, a memory, an analog-to-digital converter (ADC), a digital to analog converter (DAC), or any combination thereof, as non-illustrative examples. Circuitry 351 may depend on whether tag device 120 is a passive tag, a semi-passive tag, or an active tag.

Transmitter 356 is configured to transmit one or more signals to one or more other devices (e.g., one or more TRPs or reader device 121), and receiver 358 is configured to receive one or more signals from one or more other devices (e.g., one or more TRPs, reader device 121, core network 130). For example, transmitter 356 may transmit backscatter signal 376 to one or more TRPs, and receiver 358 may receive PRS 374 from one or more TRPs. In some implementations, transmitter 356 and receiver 358 may be integrated in one or more transceivers. Additionally or alternatively, transmitter 356 or receiver 358 may include or correspond to one or more components of tag device 120.

Tag device 120 may have a tag delay. The tag delay, such as a radio frequency (RF) group delay or other delay, may include or be based on one or more components (e.g., circuitry 351, transmitter 356, receiver 358, or a combination thereof, of the tag device. The one or more components are configured to receive a positioning reference signal, generate a backscatter signal based on the positioning reference signal, and transmit the backscatter signal. In some implementations, the tag delay is an amount of time between tag device 120 receiving a positioning reference signal and transmitting a backscatter signal based on the received positioning reference signal.

Tag device 120 may include one or more components as described herein with reference to tag device 120. In some implementations, tag device 120 is a 3GPP-capable tag device, an LTE-capable tag device, a 5G-capable tag device, a 6G-capable tag device, or a combination thereof.

Tag devices 322-325 may include similar or different components to tag device 120. Additionally, while five tag devices are depicted, system 300 may include fewer or more tag devices. Moreover, tag devices 120 and 322-325 may be equidistant or within a same range from TRP 340. In some implementations, tag devices 120 and 322-325 may be differing distances away from or within different ranges from TRP 340. In some implementations, a first group of tag devices, such as tag devices 120, 322, and 323 may each be equidistant or within the same range to TRP 340, while a second group of tag devices, such as tag devices 324, 325 may each be different distances away from TRP TRP 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, TRP 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 238, transmit processor 220, and controller 240, and memory 304 includes or corresponds to memory 242 as described with reference to base station 105 of FIG. 2.

Memory 304 includes or is configured to store instructions 305 and information 306. Information 306 may include PRS information 307, measurement gap information 308, tag device information 309, and measurement information 310.

PRS information 307 includes information that TRP 340 uses to generate a positioning reference signal (PRS) 374. For example, PRS information 307 may include one or more parameters, such a repetition rate, a bandwidth configuration, a comb pattern configuration, or any combination thereof. The repetition rate may include or indicate a number of times within a time period that a PRS is transmitted. The comb pattern may include or indicate a configurable resource block allocation. In some implementations, PRS information 307 may be generated or stored based on a TRP configuration (e.g., 372) or a PRS configuration (e.g., 381).

Measurement gap information 308 indicates one or more time periods associated with a positioning session of tag device 120. For example, measurement gap information 308 may indicate one or more time periods during which one or more TRPs are configured to monitor for PRS 374, backscatter signal 376, or a combination thereof. Additionally, or alternatively, measurement gap information 308 may indicate a time period for one or more TRPs to generate a measurement report (e.g., 378), transmit the measurement report, or a combination thereof. In some implementations, measurement gap information 308 may indicate a time period during with the one or more TRPs are to refrain from transmitting signals, such as PRS 374. For example, measurement gap information 308 may indicate a time period during which TRP 340 refrains from scheduling one or more transmission to occur. Measurement gap information 308 may be based on a TRP configuration (e.g., 372) or a measurement gap (MG) configuration 382.

Tag device information 309 includes or corresponds to information or characteristics about one or more tag devices, such as tag device 120. For example, tag device information 309 may include information about a distance, such as an approximate distance, an estimated distance, a previously calculated distance, of one or more tag devices, such as tag device 120 and tag devices 322-325 from TRP 340. For example, tag device information 309 may include, for a tag device, a tag type, a bandwidth, a PRS slot periodicity, a sensitivity, a tag delay (e.g., a group delay), or a combination thereof. A tag type may correspond to whether the tag device (e.g., tag device 120) is a passive tag, a semi-passive tag, or an active tag. Bandwidth may correspond to a bandwidth over which tag device 120 is capable of communicating. PRS slot periodicity may correspond to timeframes during which or how often tag device 120 expects to receive PRS 374. Sensitivity may correspond to a sensitivity of tag device 120 to PRS 374, such as transmit power of the PRS, a distance from a TRP at which tag device 120 can successfully receive a signal, or a combination thereof. The tag delay may correspond to an amount of time for the tag device 120 to process PRS 374 and to generate backscatter signal 376 in response to receipt, at tag device 120, or PRS 374.

Measurement information 310 includes or corresponds to propagation times associated with a positioning reference signal (e.g., 374), a backscatter signal (e.g., 376), or a combination thereof. For example, when TRP 340 is configured as a Tx TRP, measurement information 310 may include a transmit time of PRS 374, a receive time of backscatter signal 376, an amount of time that elapses from transmission of PRS 374 to receipt of backscatter signal 376, or a combination thereof. In some implementations when TRP is configured as an Rx TRP, measurement information 310 may include a receive time of PRS 374, a receive time of backscatter signal 376, an amount of time that elapses from receipt of PRS 374 to receipt of backscatter signal 376, or a combination thereof. In some implementations, measurement information 310 may include or indicate a receive time of a backscatter signal (e.g., 376), a transmit time of a positioning reference signal (e.g., 374) transmitted after receipt of the backscatter signal, an amount of time that elapses from receipt of the backscatter signal to transmission of the positioning reference signal, or a combination thereof. TRP 340 may be configured to generate a measurement report based on measurement information 310.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, core network 130, another TRP, or a network entity. Additionally, or alternatively transmitter 316 may transmit a first signal, such as a positioning reference signal (e.g., 374), and receiver 318 may receive a second signal, such as a backscatter signal (e.g., 376). In some implementations, transmitter 316 and receiver 318 may be integrated in one or more transceivers. Additionally or alternatively, transmitter 316 or receiver 318 may include or correspond to one or more components of as described with reference to UE 115 or base station 105 of FIG. 2. In some implementations, transmitter 316 and receiver 318 may be configured to operate in a full duplex mode. For example, TRP 340 may include a first panel for transmitter 316 and a second panel for receiver 318. In some other implementations, TRP 340 may not be configurable in full duplex mode.

In some implementations, TRP 340 may include one or more antenna arrays. The antenna array may include multiple antenna elements configured to perform wireless communications with other devices, such as with core network 130, another TRP, or tag device 120. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam. In some implementations, TRP 340 may be configured as or include a reader device (e.g., 120), such as an RFID reader device.

Core network 130 may include a 3GPP core network, a 4G core network, a 5G core, or an evolved packet core (EPC). Core network 130 may be coupled, such as communicatively coupled, to one or more network entities, such as TRP 340. Core network 130 may include or correspond to LMF 131.

Although shown and described as being included in core network 130, LMF 131 may be distinct from core network 130 in some implementations. For example the LMF 131 may include one or more servers, such as multiple distributed servers. LMF 131 may be configured to support various functionality, such as managing support for different location services for one or more UEs, one or more tag devices, or one or more network entities. For example, LMF may provide information to TRP 340, tag device 120, or tag devices 322-325 so that an action or an operation can be taken or performed at TRP 340, tag devices 121 and 322-235, or an combination thereof. Communication may be effectuated with the LMF 131 via a protocol, such as a NR Positioning Protocol A (NRPPa). In some implementations, TRP 340, tag devices 120 and 322-325, or combinations thereof are configured to communicate with the LMF 131 via an Access and Mobility Management Function (AMF).

In some implementations, LMF 131 is configured to support backscatter-based positioning. Accordingly, LMF 131 may include one or more processors 362 (hereinafter referred to collectively as "processor 362") and one or more memory devices 364 (hereinafter referred to collectively as "memory 364") storing instructions, executable by processor 362, to perform operations described herein. Additionally, memory 364 may be configured to store tag device information 366. Tag device information 366 may include tag delay 368 and a position 369.

To support backscatter-based positioning, LMF 131 may be configured to perform on or more operations. These functions may include generation of TRP configuration 372 and transmission of TRP configuration 372 to TRP 340. Additionally, LMF 131 may be configured to generate PRS configuration 381, measurement gap (MG) configuration 382, or a combination thereof. In some implementations, LMF 131 may be configured to receive one or more measurement reports (hereinafter referred to collectively as "measurement report 378") generated by TRP 340 or other TRPs (e.g., not depicted in FIG. 3). In some implementations, LMF 131 is configured to determine position 369 of tag device 120 based on measurement report 378. For example, LMF 131 is configured to determine position 369 of tag device 120 without knowing tag delay 368.

LMF 131 may be configured to determine a position of tag device 120 based on multiple measurement reports (referred to collectively as "measurement report 378") and without knowing tag delay 368 corresponding to tag device 120. Determining position 369 of tag device 120 may include calculating the position based on a TDoA technique. The position may be a 2D position or a 3D position. Moreover, LMF 131 may be configured to use position 369 for one or more operations, or transmit a position indicator that indicates position 369 of tag device 120 and/or any of tag devices 322-325.

In some implementations, wireless communications system 300 implements a 5G NR network. For example, wireless communications system 300 may include multiple 5G-capable devices, such as UEs and base stations configured to operate in accordance with a 5G NR network protocol such as that defined by the 3GPP. In some other implementations, wireless communications system 300 implements a 6G network.

During operation of wireless communications system 300, LMF 131 may transmit, to TRP 340, TRP configuration (e.g., 372) that indicates first information associated with first tag device 120, and second information associated with second tag device 322. For example, the first information may include or indicate a first position (e.g., a first estimated position) of first tag device 120, and the second information may include or indicate a second position (e.g., a second estimated position) of second tag device 322. In some implementations, the first position is a first distance from TRP 340 and the second position is a second distance from TRP 340. Additionally, or alternatively, the first information may include or indicate a tag address, a first training sequence or a first backscatter timeframe window for first tag device 120, and the second information may include or indicate a second training sequence or a second backscatter timeframe window for second tag device 322. The tag address may be a tag ID or a group ID that is associated with, corresponds to, or indicates at least one of tag devices 120, 322-325.

TRP 340 receives the TRP configuration (e.g., 372) and generates a tag configuration message (e.g., 380) that indicates a first tag configuration and a second tag configuration. For example, the first tag configuration may indicate a tag address, a frequency shift parameter, a phase scrambling parameter, a first preamble sequence, a first training sequence, a first backscatter timeframe window, or a combination thereof. In some implementations, the first tag configuration indicates a first frequency shift parameter, a first phase scrambling parameter, a first preamble sequence, a first training sequence, a first backscatter timeframe window, or a combination thereof. Additionally, or alternatively, the second tag configuration indicates a second frequency shift parameter, a second phase scrambling parameter, a second preamble sequence, a second training sequence, a second backscatter timeframe window, or a combination thereof.

In some implementations, the first preamble sequence and the second preamble sequence are the same sequence or are different sequences. Additionally, or alternatively, the first training sequence may be distinct from the second training sequence, or may be the same as the second training sequence. In some implementations, TRP 340 may generate the first tag configuration based on an RSSI/RSPR indicator associated with first tag device 120.

TRP 340 transmits the PRS (e.g., 374) and receives, in response to the PRS, the first backscatter signal (e.g., 376) from first tag device 120, and the second backscatter signal (e.g., 384) from second tag device 322. For example, first tag device 120 may transmit the first backscatter signal based on the PRS and the first tag configuration.

TRP 340 may determine a first backscatter signal gain associated with the first tag device based on the first training sequence, the first preamble sequence, the first backscatter signal, or a combination thereof. Additionally, or alternatively, TRP 340 may determine a second backscatter signal gain associated with the second tag device based on the second training sequence, the second preamble sequence, the second backscatter signal, or a combination thereof. For example, by configuring the tag devices to include the preamble sequence in their backscatter signals, TRP 340 may identify the backscatter signals received from the tag devices as being associated with tag devices that are within a threshold range to TRP 340. In this manner, the TRP 340 may estimate the first backscatter channel gain and the second backscatter channel gain by searching for the preamble sequence in the backscatter signals. As another example, by configuring one or more tag devices from among a plurality of tag devices to include distinct training sequences in their reflected backscatter signals, TRP 340 may disambiguate backscatter signals received from each of the tag devices, thereby estimating a backscatter channel gain for each tag device of the plurality of tag devices.

TRP 340 generates and transmits, to the LMF 131, a measurement report that indicates a first RTT of first tag device 120, and a second RTT of second tag device 322. The measurement report may include or correspond to measurement report 378. The first RTT may be based on the first tag configuration and the first backscatter signal, and the second RTT may be based on the second tag configuration and the second backscatter signal. LMF 131 may determine a position of first tag device 120 or second tag device 322 based on the measurement report.

In some implementations, tag configuration message 380 indicates a third tag configuration for third tag device 323, a fourth tag configuration for fourth tag device, 324 or a combination thereof. TRP 340 may receive, from third tag device 323, a third backscatter signal based on PRS 374. Additionally, or alternatively, TRP 340 may receive, from a fourth tag device, a fourth backscatter signal based on PRS 340. Third tag device 323 may be a third distance from TRP 340, and fourth tag device 324 may be a fourth distance from TRP 340.

In some implementation, TRP 340 may allocate first tag device 120 and third tag device 323 to a first group based on the first distance and the third distance. The allocation of tag devices 120 and 323 to the first group may be indicated or associated with tag configuration message 380. TRP 340 may allocate second tag device 322 and fourth tag device 324 to a second group based on the second distance and the fourth distance. The allocation of tag devices 322 and 324 to the second group may be indicated or associated with tag configuration message 380. In some implementations, the first distance and the third distance are within a first threshold range of TRP 340. Additionally, or alternatively, the second distance and the fourth distance are within a second threshold range of TRP 340 that is different from and non-overlapping with the first threshold range.

In some implementations, tag configuration message 380 includes or indicates a third tag configuration indicates a third training sequence distinct from the first training sequence, ta fourth tag configuration indicates a fourth training sequence distinct from the second training sequence; or a combination thereof. TRP 340 may determine a first backscatter signal gain associated with first tag device 120 based on the first training sequence, the first preamble sequence, and first backscatter signal 376. Additionally, or alternatively, determining a third backscatter signal gain associated with third tag device 323 based on the third training sequence, based on a third preamble sequence, and the third backscatter signal. In some implementations, the first preamble sequence and the third preamble sequence are the same preamble sequence.

As described with reference to FIG. 3, the present disclosure provides techniques for supporting backscatter-based positioning. The techniques described facilitate determining position 369, such as a two dimensional or a three dimensional position, of a tag device, such as tag device 120, that has limited on-board power and computational resources (e.g., a passive or semi-passive tag). To illustrate, LMF 131 is able to provide TRP configuration 372 (e.g., PRS configuration 381) to one or more TRPs, such as TRPS 340-348, that accounts for particular characteristics of the tag device, such as limited on-board power or computational resources of the tag device. Additionally, LMF 131 is able to determine a position of tag device 120 based on one or more measurement reports 378 when a tag delay of tag device 120 is unknown or unavailable. For example, LMF 131 may perform TDoA backscatter-based positioning based measurements of multiple TRPS 340-349 when tag delay 368 of tag device is unknown or unavailable to a device that calculates position 369 of tag device 120.

The disclosure facilitates determination of a position, such as a two dimensional or a three-dimensional position, of one or more tag devices subject to the computational and power constraints of passive and semi-passive tag devices. For example, by providing a tag configuration message 380 that indicates a first tag configuration and a second tag configuration, TRP 340 may configure each of one or more tag devices such that, in response to PRS 374 transmitted by TRP 340, a tag device 120, 322-325 may generate and transmit a backscatter signals having pattern, such as a preamble sequence, a training sequence, a backscatter timeframe window, or a combination of these, to distinguish among backscatter signals received at TRP 340 from another tag device. Additionally, TRP 340 is configurable to apply different techniques, that depend upon a distance of the one or more tag devices from TRP 340, to differentiate backscatter signals received from the one or more tag devices. For example, if a group of tag devices is within a threshold range from TRP 340, TRP 340 may receive backscatter signals from the tag devices concurrently or substantially concurrent. Accordingly, TRP 340 may distinguish among the received backscatter signals by configuring the one or more tag devices to include training sequence patterns in the backscatter signals that are unique for each tag device. In contrast, if at least one tag device in is of a differing distance away from TRP 340 as compared to the one or more tag device, TRP 340 may configure the at least one tag device to provide backscatter signals over differing backscatter timeframe windows. For instance, TRP 340 may configure a first tag device that is at a further distance from TRP 340 than a second tag device to transmit the backscatter signal over a longer backscatter timeframe window than a second tag device that is nearer to TRP 340 to account for possible attenuation to the backscatter signal due to the greater distance. Moreover, the disclosed techniques may processes backscatter signals from one or more tag devices that are in a first group in a first threshold distance to TRP 340 and in a second group in in a second threshold distance to TRP 340. Accordingly, in this manner, the techniques facilitate determination, by TRP 340, of an RTT to and from one or more tag devices, thereby facilitating determination of positions of the one or more tag devices.

Figure 4:
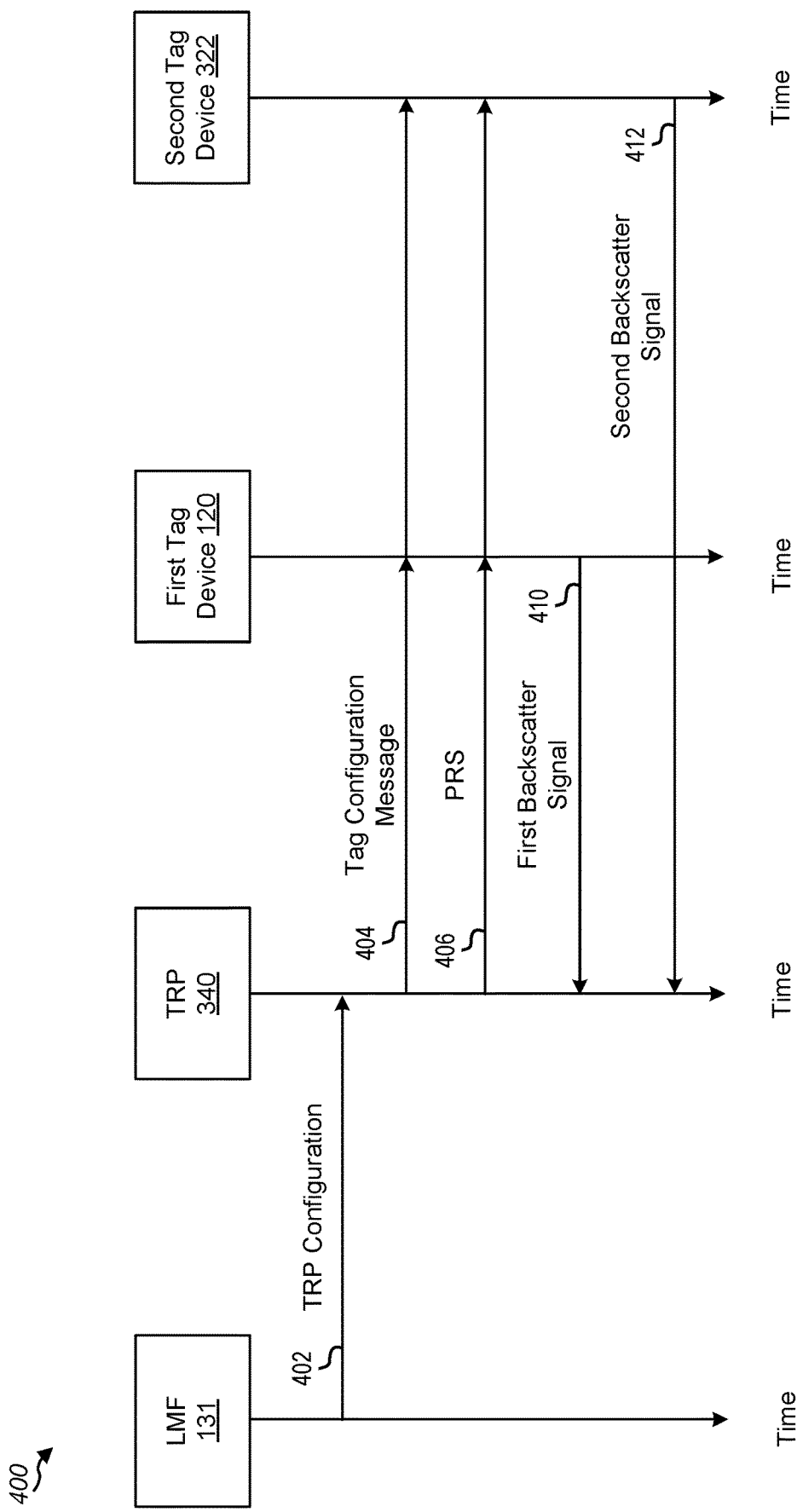
FIG. 4 is a ladder diagram illustrating an example of backscatter-based positioning according to one or more aspects.

FIG. 4 is ladder diagram illustrating an example of backscatter based positioning according to aspects of the present disclosure. As shown in FIG. 4, a wireless communication system 400 of the ladder diagram of FIG. 4 includes first tag device 120, LMF 131, second tag device 322, and TRP 340. Wireless communication system 400 may include or correspond to wireless communication system 100 or 300. While FIG. 4 depicts singular TRP 340, wireless communication system 400 may include TRP. Additionally, or alternatively, although wireless communication system 400 includes two tag devices, in other implementation, wireless communication system 400 may include fewer or more than two tag devices.

During operation of system 400, at 402, LMF 131 transmits a TRP configuration to TRP 340. For example, the TRP configuration may include or correspond to TRP configuration 372, PRS configuration 381, MG configuration 382, PRS information 307, measurement gap information 308, tag device information 366 or 309, or a combination thereof.

At 404, TRP 340 transmits a tag configuration message. For example, the tag configuration message may include or correspond to tag configuration message 380 or tag device information 309 or 366. The tag configuration message may be received by first tag device 120 and second tag device 322.

At 404, TRP 340 transmits a PRS. For example, the PRS may include or correspond to positioning reference signal 374. The PRS message may be received by first tag device 120 and second tag device 322.

At 410, first tag device 120 transmits a first backscatter signal in response to the PRS. For example, first tag device 120 may reflect the PRS to generate the first backscatter signal. The first backscatter signal may include or correspond to backscatter signal 376. The first backscatter signal may be received by TRP 340.

At 412, second tag device 322 transmits a second backscatter signal in response to the PRS. For example, second tag device 322 may reflect the PRS to generate the second backscatter signal. The second backscatter signal may include or correspond to backscatter signal 384. The second backscatter signal may be received by TRP 340.

In some implementations, the first tag device is a first distance from the TRP and the second tag device is a second distance from the TRP. The first distance and the second distance may be estimated distances. The first distance may be substantially equal to the second distance—e.g., both the first distance and the second distance are within a threshold range of TRP 340. In some such implementations, the first backscatter signal and the second backscatter signal may have different phase shifts, different phase scrambling, different modulation (e.g., training sequences), or a combination thereof. Alternatively, the first distance may be less than the second distance. In some such implementations, the first backscatter signal and the second backscatter signal may have different phase shifts, different phase scrambling, different modulation (e.g., training sequences), different backscatter timeframe windows, or a combination thereof. In implementations where the first tag device is close to the TRP than the second tag device, the first backscatter signal may be shorter (e.g., in time the time domain) as compared to the second backscatter signal, the first and second backscatter signals may have the same training sequence, or a combination thereof.

In some implementations, LMF 131 transmits, to TRP 340, TRP configuration (e.g., 372) that indicates first information associated with first tag device 120, and second information associated with second tag device 322. For example, the first information may include or indicate a first position (e.g., a first estimated position) of first tag device 120, and the second information may include or indicate a second position (e.g., a second estimated position) of second tag device 322. Additionally, or alternatively, the first information may include or indicate a first training sequence or a first backscatter timeframe window for first tag device 120, and the second information may include or indicate a second training sequence or a second backscatter timeframe window for second tag device 322. TRP 340 receives the TRP configuration (e.g., 372) and generates a tag configuration message (e.g., 380) that indicates a first tag configuration and a second tag configuration. For example, the first tag configuration may indicate a tag address, a frequency shift parameter, a phase scrambling parameter, a first preamble sequence, a first training sequence, a first backscatter timeframe window, or a combination thereof. TRP 340 transmits the PRS (e.g., 374) and receives, in response to the PRS, the first backscatter signal (e.g., 376) from first tag device 120, and the second backscatter signal (e.g., 384) from second tag device 322. For example, first tag device 120 may transmit the first backscatter signal based on the PRS and the first tag configuration. TRP 340 generates and transmits, to the LMF 131, a measurement report that indicates a first RTT of first tag device 120, and a second RTT of second tag device 322. The measurement report may include or correspond to measurement report 378. The first RTT may be based on the first tag configuration and the first backscatter signal, and the second RTT may be based on the second tag configuration and the second backscatter signal. LMF 131 may determine a position of first tag device 120 or second tag device 322 based on the measurement report.

Figure 5:
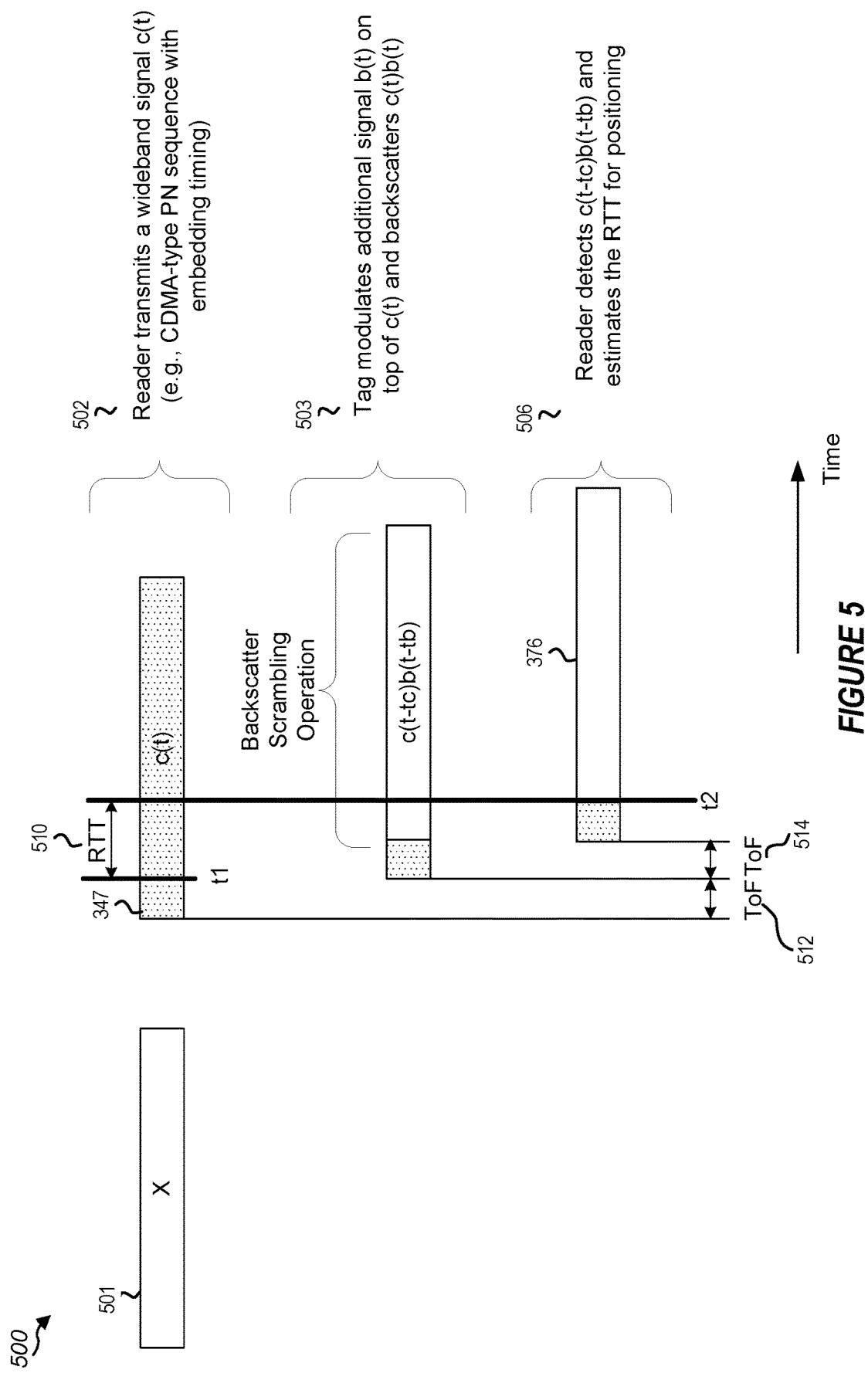
FIG. 5 is a conceptual timing diagram of another example of a system that supports backscatter-based positioning according to one or more aspects.

FIG. 5 is a conceptual diagram that supports backscatter-based positioning according to one or more aspects. At 502, a TRP, such as TRP 340, transmits a configuration message X (e.g., a configuration signal). The configuration message may include or correspond to tag configuration message 380. The configuration message may include or indicate a tag address of a tag device (e.g., first tag device 120), a modulation scheme of the tag device for generation of backscatter signal 376, or a combination thereof. Tag address may indicate a tag identifier of first tag device 120, a group identifier associated with first tag device 120, or a combination thereof. The modulation scheme may indicate a frequency shift parameter, a phase scrambling parameter, an on/off pattern, modulation data, or a combination thereof. In some implementations, the configuration message X is a bipartite signal that includes a first component, corresponding to an energy signal, configured to provide energy to first tag device 120, and a second component, corresponding to tag configuration data. In some implementations, the first component or the configuration message X may operates as a wake-up signal to first tag device 120.

After transmission of the configuration message, the TRP transmits PRS 374. PRS 374 may include or correspond to a wideband signal c(t). For example, c(t) may a code-division multiple access-pseudo random (CDMA-PN) signal with chip-rate equal to a frequency of the Tx TRP, denoted $f_{TxTRp}$. In some implementations, c(t) may be selected to have robust auto-correlation with $c(t-t_c)$, corresponding to a time shifted component of PRS that may be included in backscatter signal received at a Rx TRP.

A beginning of PRS 374 may have a time of flight (ToF) 512 from TRP 340 to first tag device 120. At 503, first tag device 120, may be configured to modulated signal b(t) on top of PRS, c(t), and may reflect combined c(t)b(t) as the backscatter signal to TRP 340. It is noted that first tag device 120 may experience a processing delay from receipt of configuration message X to a beginning of the backscatter scrambling operations. Accordingly, the beginning of the backscatter scrambling operations may not being at the beginning of PRS 340 as received by first tag device 120.

In some implementations, backscatter signal may be frequency shifted, such that the backscatter signal (e.g., backscatter signal 376), mathematically at tag device 120, corresponds to $c(t-t_c)b$(frequency shifted signal). As an example, frequency shifted signal may correspond to $e^{j(2\pi f_b t+\phi)}$ when frequency shift parameter includes a frequency shift waveform $e^{j(2\pi f_b t+\phi)}$ with a backscatter frequency offset value $f_b$. In some implementations, backscatter signal may be phase scrambled, such that the backscatter signal (e.g., backscatter signal 376), mathematically at tag device 120, corresponds to $h_b c(t-t_c)b(t-t_b)$, where $t_c$ corresponds to a PRS time offset value and $t_b$ corresponds to a backscatter signal time offset value. As a further example, in generating a phase scrambled backscatter signal, tag device 120 may be configured to convert a frequency of the backscatter signal to the following: $f_{tag\ device}=f_{TRP}/K$, where K is a scaling factor included in as phase scrambling parameter.

At 506, TRP 340 receives backscatter signal 376. It is noted that a ToF 514 occurs from transmission of backscatter signal 376 to reception of backscatter signal 376 by TRP 340 (e.g., a reader). It is also noted that a tag delay may be present be between ToF 512 and ToF 514. Since the received backscatter signal has been contaminated with interference, the received backscatter signal, at TRP 340, mathematically may be represented as $r(t)=h_c c(t)+bh_b c(t-t_c)$ (frequency shift waveform)$+\Sigma_i h_i c(t-t_i)$ when the backscatter signal has been frequency shifted at tag device 120 and as $r(t)=h_c c(t)+h_b c(t-t_c)b(t-t_b)+\Sigma_i h_i c(t-t_i)$, when the backscatter signal has been phase scrambled. It is note that for a multi tag s scenario, the detection problem becomes $r(t)=h_c c(t)+\Sigma_i h_{b,i} c(t-t_{c,i})b_i(t-t_{b,i})+\Sigma_i h_i c(t-t_i)$.

Additionally at 506, TRP 340 may perform operations on the received backscatter signal to extract, cancel, or negate interference in the received backscatter signal. In some implementations, in response to receiving a frequency shifted backscatter signal, TRP 340 may remove one or more components of frequency shift parameter included in the received backscatter signal, apply a low pass filter to the backscatter signal to remove interference-related components of the received backscatter signal, and correlate PRS, c(t), with a time shifted component of PRS included in the received backscatter signal, $c(t-t_c)$, by selecting an appropriate PRS time offset value, $t_c$.

In some implementations, in response to receiving a frequency shifted backscatter signal, TRP 340 may remove one or more components of frequency shift parameter included in the received backscatter signal, apply a low pass filter to the backscatter signal to remove interference-related components of the received backscatter signal, and correlate transmitted PRS, c(t), with a time shifted component of PRS included in the received backscatter signal, $c(t-t_c)$, by selecting an appropriate PRS time offset value, $t_c$.

In some implementations, in response to receiving a phase scrambled backscatter signal, TRP 340 may remove one or more components of the received backscatter signal that have not been phase scrambled. For example, TRP 340 may perform a double correlation by first correlating the received backscatter signal with $b(t-t_b)$ with appropriate $t_b$, and then correlating transmitted PRs, c(t), with a time shifted component of PRS included in the received backscatter signal, $c(t-t_c)$, by selecting an appropriate PRS time offset value, $t_c$.

In some implementations, TRP 340 receives a modulated portion of backscatter signal at time t2. TRP 340 may correlate the modulated portion (e.g., a symbol or chip) to a portion of PRS 374 that was transmitted at a time t1. Accordingly, TRP 340 may determine the RTT of first tag device 120 based on time t2, time t2, the tag delay of first tag device 120, or a combination thereof.

Figure 6:
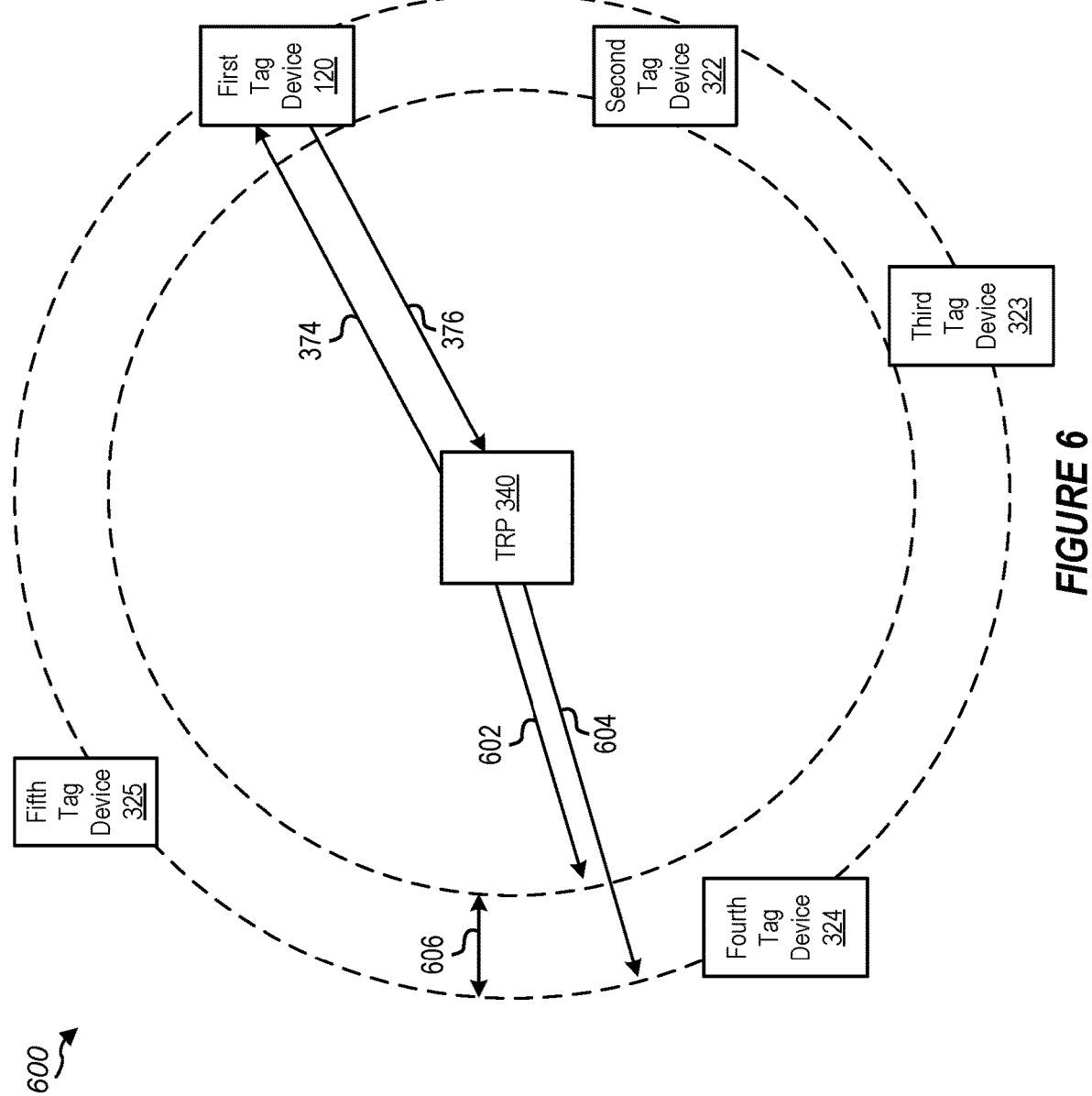
FIG. 6 is a block diagram of another example of a system that supports backscatter-based positioning according to one or more aspects.

FIG. 6 is a block diagram of another example of a system 600 that supports backscatter-based positioning according to one or more aspects. In some examples, system 600 (e.g., a wireless communication system) may include or correspond to wireless communication system 100, 300, 400, or 500. System 600 includes TRP 340 and tag devices 120 and 322-325.

As shown, each of tag devices 120 and 322-325 is within a range 606—e.g., a threshold range. For example, the range me be based on a first distance 602 and a second distance 604. In some implementations, range 606 is based on the speed of light and a duration of a time unit, such as a symbol—e.g., 10 ms, as an illustrative, non-limiting example. TRP 340 may transmit PRS 374 and may receive one or more backscatter signals, such as first backscatter signal 376 from first tag device 120. In some implementations, TRP 304 may receive a backscatter signal from one or more of tag devices 120, 322-325.

In some implementations, TRP 340 transmits a tag configuration message to tag devices 322-325 that includes a preamble sequence, which, in some implementations, may be identical. Accordingly, each tag device 322-325 is configured to generate a backscatter signal that is encoded with the preamble sequence. Since the tag devices 322-325 are within the same threshold range to TRP 340, TRP 340 will receive the backscatter signals from each tag device 322-325 at roughly the same time—e.g., concurrently. By encoding the preamble sequence in the backscatter signals, TRP 340 may more readily identify the backscatter signals, distinguishing the backscatter signals from other signals, such as interference.

In some implementations, TRP 340 transmits a tag configuration to tag devices 322-325 that includes unique training sequences, such that each tag device 322-325 may receive a unique training sequence in the tag configuration message. In this manner, tag devices 322-325 are each configured to generate and transmit backscatter signals encoded with a unique training sequence. Accordingly, TRP 340 may distinguish among backscatter signals received from each tag device 322-325 based on the training sequence included in each backscatter signal and attributable to a particular tag device 322-325.

In some implementations, TRP 340 is configured to determine an RTT associated with transmission of a PRS, such as PRS 374, to tag devices that are within a threshold range (e.g., roughly equidistant) to TRP 340 such that travel times of backscatter signals are essentially equal as follows: $t_{c,tag\ 120}=t_{c,tag322}=\ldots=t_{c,tag\ 325}=t_c$. In particular, tag devices, such as tag devices 120, 322-325 may be considered to be roughly equidistant to TRP 340 if their distances from RTP 340 are within a distance within a threshold range that corresponds to a duration of a symbol of PRS (e.g., PRS 374) multiplied by the speed of light (e.g., in air) as depicted at range 606.

Mathematically, the backscatter signals received, at TRP 340, from each tag device 120, 322-325 may be modelled as $r(t)=h_c c(t)+c(t-t_c) \Sigma_i h_{b,i} b_i(t-t_{b,i})+\Sigma_i h_i c(t-t_i)$. In the foregoing equation, r(t) may include or correspond to backscatter signals received at TRP 340 from plurality of tags 120, 322-325; $h_c c(t)$ may include or correspond to self-interference attributable to the PRS, c(t); $c(t-t_c) \Sigma_i h_{b,i} b_i(t-t_b,i)$ may include or correspond to a manipulated backscatter signal, $b_i(t-t_{b,i})$, modulated onto PRS 374, $c(t-t_c)$, backscatter coefficients, $h_{b,i}$ corresponding to a backscatter channel gain; and Et hic(t-$t_i$) may include or correspond to interference from environmental sources, such as objects proximate to tag devices 120, 322-325. In particular, each tag device 120, 322-325 may be configured to transmit a signal to TRP 340 that has been manipulated by data included in a tag configuration message, such as tag configuration message 380. For example, the manipulated backscatter signal $b_i(t-t_{b,i})$ may be frequency shifted, phase scrambled, include a preamble sequence, include a training sequence, or any combination thereof based on the tag configuration message.

To arrive at an RTT for tag devices 120, 322-325, TRP 340 may estimate time offset $t_c$. Accordingly, to estimate time offset, $t_c$, TRP 340 may estimate backscatter coefficients, $h_{b,i}$, to determine a superposition of backscatter waveforms $\Sigma_i h_{b,i} b_i(t-t_{b,i})$. For example, TRP 340 may configure tag devices 120, 322-325 to include a preamble sequence, such as [1–1 1–1] in backscatter signals, $b_i(t-t_{b,i})$, so that, when TRP 340 simultaneously receives backscatter signals from tag devices 120, 322-325, TRP 340 is able to determine a backscatter channel gain, corresponding to $\Sigma_i h_{b,i}$. As another example, TRP 340 may configure tag devices 120, 322-325 to include unique training sequences per tag device, in addition to the phase sequence, such that the backscatter channel gain correspond to each tag device can be determined. For instance, TRP 340 may configure tag device 120 with first training sequence [1 1] and tag device 323 with second tag training sequence [1, −1]. In some implementations, each tag device in a group of tag devices include within a threshold range may have the different training sequences. In other implementations, two tag devices in the same group may have the same training sequences, but may be distinguishable in a different manner, such as having different frequency shifts.

Figure 7:
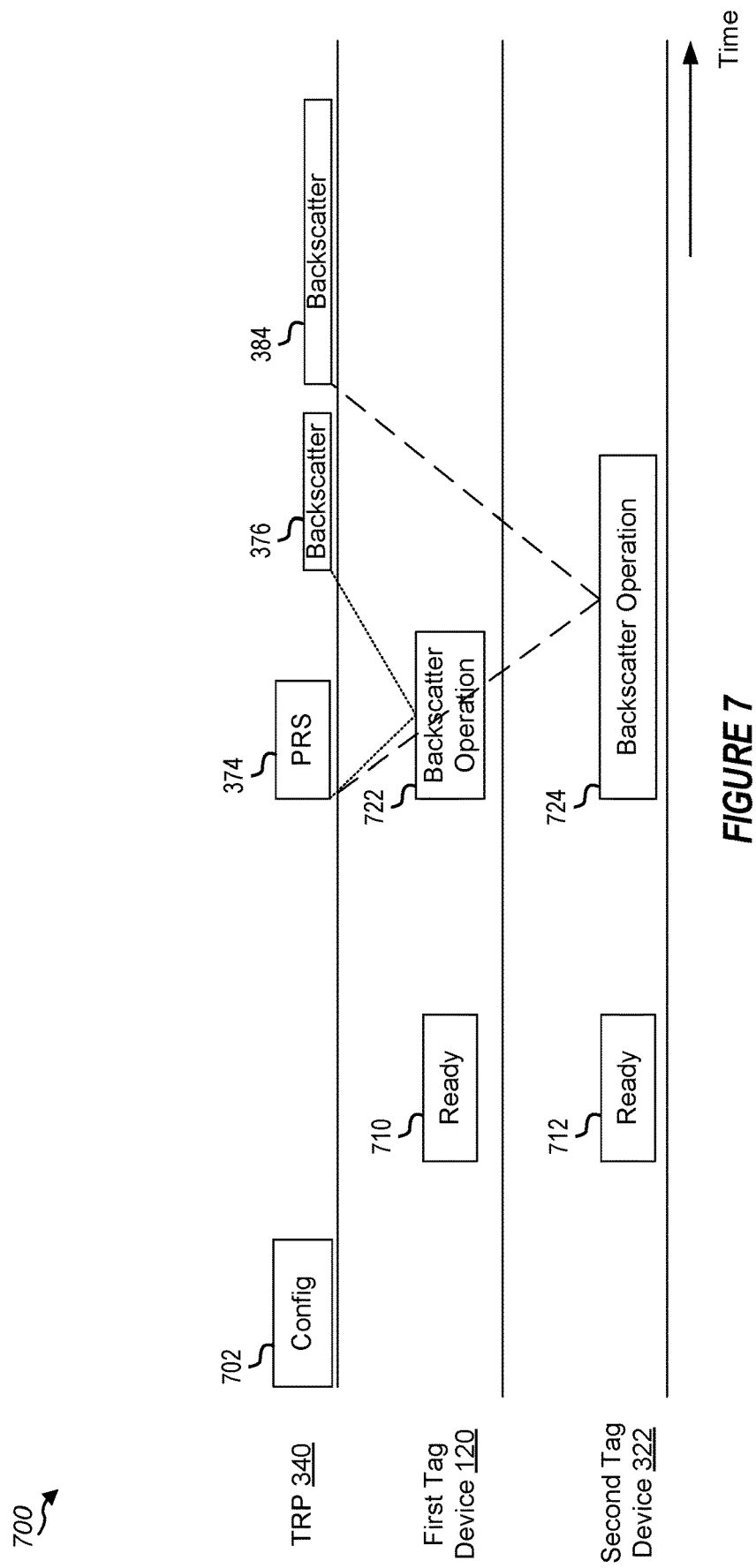
FIG. 7 is a timing diagram of another example of a system that supports backscatter-based positioning according to one or more aspects.

FIG. 7 is a timing diagram of another example of a system 700 that supports backscatter-based positioning according to one or more aspects. In some examples, system 700 (e.g., a wireless communication system) may include or correspond to wireless communication system 100, 300, 400, 500, or 600. System 700 includes TRP 340 and tag devices 120 and 322.

TRP 340 may transmit a configuration message 702. Configuration message 702 may include or correspond to configuration message X of FIG. 5. Based on configuration 702 each of first tag device 120 and second tag device 322 may make ready (e.g., 710 and 712 respectively) to receive PRS 374. For example, first tag device 120 and/or second tag device 322 may wake-up, determine or select a corresponding tag configuration, configuration one or more components, or a combination thereof. In some implementations, to select a tag configuration, first tag device 120 and/or second tag device 322 may determine a corresponding RSSI/RSRP based on the configuration message 702 or based on PRS 374.

TRP 340 may transmit PRS 374. First tag device 120 may perform backscatter operations 722 on PRS 374 and second tag device 322 may perform backscatter operations 724 on PRS 374. Based on backscatter operations 722 performed by first tag device 120, first tag device 120 may generate a first backscatter signal 376 that is received by TRP 340. Based on backscatter operations 724 performed by second tag device 322, second tag device 322 may generate second backscatter signal 384 that is received by TRP 340.

It is noted that that second tag device 322 may be positioned farther from TRP 340 than first tag device 120. For example, first tag device 120 is a first distance from TRP 340 and second tag device 322 is a second distance from TRP 340. The first distance may be less than the second distance. To illustrate, the first distance may be within a first threshold range of TRP 340 and the second distance is within a second threshold range of TRP 340 that is different from and non-overlapping with the first threshold range—e.g., the second threshold range is farther away from TRP 340 than the first threshold range. Configuration message 702 may allocate first tag device 120 to a first group based on the first distance and may allocate second tag device 322 to a second group based on the second distance. The first group may be associated with a first tag configuration that includes or indicates a first backscatter timeframe window. The second group associated with a second configuration that includes or indicates a second backscatter timeframe window. The second backscatter timeframe window is longer than the first backscatter timeframe window, such that a first duration of the first backscatter signal is less than (e.g., shorter than) a second duration of the second backscatter signal. In such situations, TRP 340 may have a longer sequence of second backscatter 382 (as compared to first backscatter 376) for correlation. Additionally, the shorter time period of the first backscatter window and the farther distance of second tag device 322, contributes to first backscatter signal 376 and second backscatter signal 384 not overlapping in time (e.g., not interfering with each other).

In some implementations, the tag devices, such as first tag device 120 and second tag device 322, have different distances from TRP 340, such that a time offset associated with first tag device 120, $t_{c,tag\ 120}$, "a time offset associated with second tag device, 322, $t_{c,tag\ 322}$. This differing time offset is attributable to the fact that a first distance, separating first tag device 120 from TRP 340, is shorter than a second distance, separating second tag device 322 from TRP 340, as depicted in the example of FIG. 7. Accordingly, backscatter signal 376, associated with first tag device 120, is likely to be less attenuated than backscatter signal 384, associated with second tag device 322. Therefore, less processing time may be necessary to process first backscatter signal 376 as opposed to second backscatter signal 384. Accordingly, TRP 340 may configure second tag device 322 with a longer backscatter timeframe window than first tag device 120.

Figure 8:
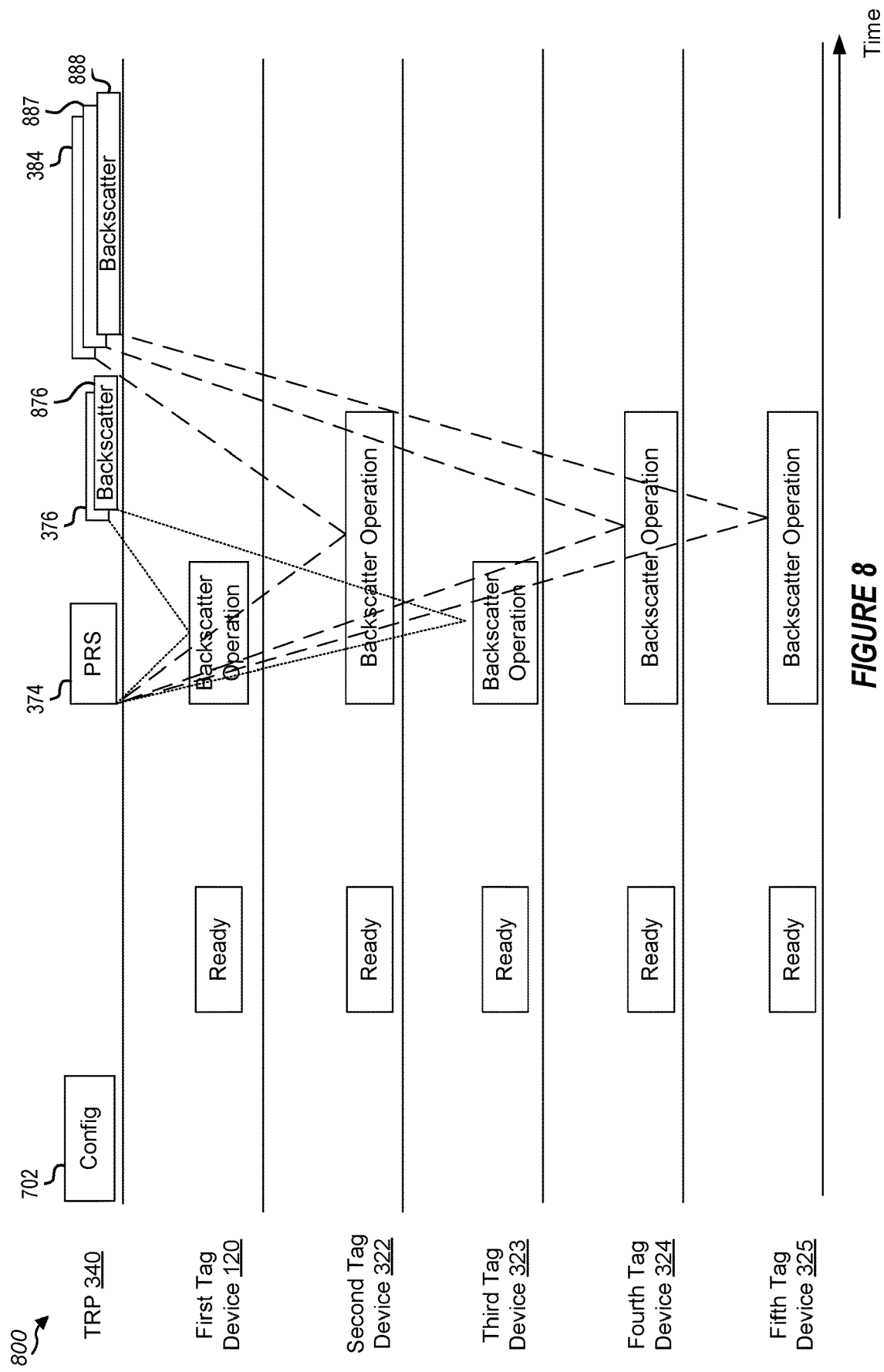
FIG. 8 is a timing diagram of another example of a system that supports backscatter-based positioning according to one or more aspects.

FIG. 8 is a timing diagram of another example of a system 800 that supports backscatter-based positioning according to one or more aspects. In some examples, system 800 (e.g., a wireless communication system) may include or correspond to wireless communication system 100, 300, 400, 500, 600, or 700. System 800 includes TRP 340 and tag devices 120 and 322-325.

TRP 340 may transmit a configuration message 702. Configuration message 702 may include or correspond to configuration message X of FIG. 5. Based on configuration 702 each of tag devices 120, 322-325 may make ready to receive PRS 374. For example, tag devices 120, 322-325 may wake-up, determine or select a corresponding tag configuration, configuration one or more components, or a combination thereof. In some implementations, to select a tag configuration, tag devices 120, 322-325 may determine a corresponding RSSI/RSRP based on the configuration message 702 or based on PRS 374.

TRP 340 may transmit PRS 374. Each of tag devices 120, 322-325 may perform backscatter operations on PRS 374 to generate a correspond backscatter signal based on a tag configuration of the tag device. For example, first tag device 120 generates first backscatter signal 376, second tag device 322 generates second backscatter signal 384, third tag device 323 generates third backscatter signal 876, fourth tag device 324 generates fourth backscatter signal 887, and fifth tag device 325 generates fifth backscatter signal 888.

It is noted that that second tag device 322, fourth tag device 324, and fifth tag device 325 may be positioned farther from TRP 340 than first tag device 120 and third tag device 323. For example, tag device 120 and 323 may be a first distance (e.g., within a first range) from TRP 340 and tag device 322, 324, 325 may be a second distance (e.g., within a second range) from TRP 340. The first distance may be less than the second distance. To illustrate, the first distance may be within a first threshold range of TRP 340 and the second distance is within a second threshold range of TRP 340 that is different from and non-overlapping with the first threshold range—e.g., the second threshold range is farther away from TRP 340 than the first threshold range. Configuration message 702 may allocate tag device 120, 323 to a first group based on the first distance and may allocate tag devices 322, 324, 325 to a second group based on the second distance. The first group may be associated with a first backscatter timeframe window. The second group associated with a second backscatter timeframe window. The second backscatter timeframe window is longer than the first backscatter timeframe window, such that a first duration of the first backscatter signal is less than (e.g., shorter than) a second duration of the second backscatter signal. In such situations, TRP 340 may have a longer sequence of second backscatter 382 (as compared to first backscatter 376) for correlation. Additionally, the shorter time period of the first backscatter window and the farther distance of second tag device 322, contributes to first backscatter signal 376 and second backscatter signal 384 not overlapping in time (e.g., not interfering with each other).

For each of the first group and the second group, tag devices within a respective group may have different modulations—e.g., different training sequences or different phase shifts. The different modulations are applied to the backscatter signal and enable TRP 340 to identify or recover backscatter signals from different tag devices include in the same group.

In some implementations, a first plurality of tag devices might within a first threshold range (e.g., be roughly equidistant) to a TRP, such as TRP 340, while a second plurality of tag devices might each have different distances to TRP 340. The second plurality of tag devices may be within a second threshold range. The first threshold range and the second threshold range may at least partially overlap or may be entirely non-overlapping. An LMF, such as LMF 131, may group the tag devices based upon estimated distances of the tag devices to TRP 340. For instance, LMF 131 may group the first plurality of tag devices into a first group, and LMF 131 may group the second plurality of tag devices into a second group. Thereafter, LMF 131 may inform TRP 340 of which tag devices have been allocated to each group. Alternatively, LMF 131 may provide relative and estimate distance information regarding tag devices to TRP 340, and TRP 340 may then use this estimated distance information to group tag devices into a first group, corresponding to tag devices that are withing the same first threshold range to TRP 340, and into a second group, corresponding to tag devices that have different distances from TRP 340—e.g., within the same second threshold range. Once having grouped the tag devices, TRP 340 may apply the algorithms and techniques described herein to determine RTTs for tag devices in each group.

FIG. 9 is a flow diagram illustrating an example process 900 that supports backscatter-based positioning according to one or more aspects. Operations of process 900 may be performed by a network entity, such as base station 105, UE 115, LMF 131, reader device 121, TRP 340, or a network entity as described with reference to FIG. 11. For example, example operations of process 900 may enable the network entity to support backscatter-based positioning.

At block 902, the network entity transmits a tag configuration message that indicates a first tag configuration for a first tag device and a second tag configuration for a second tag device. For example, the tag configuration message may include or correspond to tag configuration message 380, the first tag device may include or correspond to first tag device 120, and the second tag device may include or correspond to second tag device 322. It is understood that the first tag device, the second tag device, or either may include or correspond to any of third tag device 323, fourth tag device 324, or fifth tag device 325. In some implementations, the first tag configuration for the first tag device may indicate a first frequency shift parameter, a first phase scrambling parameter, a first preamble sequence, a first training sequence, a first backscatter timeframe window, or a combination thereof. Additionally, or alternatively, the second tag configuration for the second tag device may indicate a second frequency shift parameter, a second phase scrambling parameter, a second preamble sequence, a second training sequence, a second backscatter timeframe window, or a combination thereof; or a combination thereof.

At block 904, the network entity transmits a PRS. For example, the PRS may include or correspond to PRS 374.

At block 906, the network entity receives, from the first tag device, a first backscatter signal based on the PRS. The first backscatter signal may include or correspond to backscatter signal 376.

At block 908, the network entity receives, from the second tag device, a second backscatter signal based on the PRS. The second backscatter signal may include or correspond to second backscatter signal 384.

At block 910, the network entity transmits a measurement report. The measurement report may include or correspond to measurement report 378. The measurement report may include or indicate a first RTT of the first tag device. The first RRT may be based on the first configuration and the first backscatter signal. Additionally, or alternatively, the measurement report may include or indicate a second RTT of the second tag device. The second RTT may be based on the second configuration and the second backscatter signal.

In some implementations, the tag configuration message indicates a tag address, a frequency shift parameter, a phase scrambling parameter, a preamble sequence, a training sequence, a backscatter timeframe window, or a combination thereof. In some implementations, the first tag configuration indicates a first frequency shift parameter, a first phase scrambling parameter, a first preamble sequence, a first training sequence, a first backscatter timeframe window, or a combination thereof. Additionally, in some implementations, the second tag configuration indicates a second frequency shift parameter, a second phase scrambling parameter, a second preamble sequence, a second training sequence, a second backscatter timeframe window, or a combination thereof.

In some implementations, the first preamble sequence and the second preamble sequence are the same sequence. Additionally, or alternatively, the first training sequence and the second training sequence may be the same training sequence. Alternatively, the first training sequence may be distinct from the second training sequence.

In some implementations, the first tag device is a first distance from the TRP, the second tag device is a second distance from the TRP, or a combination thereof. In some implementations, the first distance is a first estimated distance, the second tag distance is a second estimated distance, or a combination thereof. In some implementations, the network entity receives a TRP configuration that indicates the first distance, the second distance, or a combination thereof. For example, the TRP configuration may include or correspond to TRP configuration 372, PRS configuration 381, MG configuration 382, PRS information 307, measurement gap information 308, tag device information 366 or 309, or a combination thereof. The network entity may determine the first distance based on a first RSSI/RSRP indicator corresponding to the first backscatter signal. Additionally, or alternatively, the network entity may determining the second distance based on a second RSSI/RSPR indicator corresponding to the second backscatter signal. In some implementations, the first distance is greater than the second estimated distance, and the first backscatter timeframe window is greater (e.g., longer) than the second backscatter timeframe window. For example, a first duration of the first backscatter signal may be greater than a second duration of the second backscatter signal.

In some implementations, the first distance and the second distance are within a threshold range from the network entity, and the first preamble sequence and the second preamble sequence are the same sequence. Additionally, the network entity may determine backscatter channel gain for the first tag device based on the first preamble sequence and a first portion of the first backscatter signal.

In some implementations, the network entity determines a first backscatter signal gain associated with the first tag device based on the first training sequence, the first preamble sequence, the first backscatter signal, or a combination thereof. Additionally or alternatively, the network entity may determine a second backscatter signal gain associated with the second tag device based on the second training sequence, the second preamble sequence, the second backscatter signal, or a combination thereof.

In some implementations, the tag configuration message indicates a third tag configuration for a third tag device (e.g., third tag device 323), a fourth tag configuration for a fourth tag device (e.g., fourth tag device 324), or a combination thereof. In some implementations, the network entity receives, from a third tag device, a third backscatter signal based on the PRS, and receives, from a fourth tag device, a fourth backscatter signal based on the PRS. The third tag device may be a third distance from the network entity, and the fourth tag device may be a fourth distance from the TRP.

In some implementations, the network entity allocates the first tag device and the third tag device to a first group based on the first distance and the third distance. Additionally or alternatively, the network entity allocates the second tag device and the fourth tag device to a second group based on the second distance and the fourth distance. In some implementations, the first distance and the third distance are within a first threshold range of the network entity. Additionally or alternatively, the second distance and the fourth distance are within a second threshold range of the network entity that is different from and non-overlapping with the first threshold range.

In some implementations, the third tag configuration indicates a third training sequence distinct from the first training sequence, the fourth tag configuration indicates a fourth training sequence distinct from the second training sequence, or a combination thereof. In some implementations, the network entity determines a first backscatter signal gain associated with the first tag device based on the first training sequence, the first preamble sequence, and the first backscatter signal. Additionally or alternatively, the network entity may determine a third backscatter signal gain associated with the third tag device based on the third training sequence, based on a third preamble sequence, and the third backscatter signal. In some implementations, the first preamble sequence and the third preamble sequence are the same preamble sequence.

FIG. 10 is a flow diagram illustrating an example process 1000 that supports backscatter-based positioning according to one or more aspects. Operations of process 1000 may be performed by a network entity, such as base station 105, UE 115, LMF 131, reader device 121, TRP 340, or a network entity as described with reference to FIG. 11. For example, example operations of process 1000 may enable the network entity to support backscatter-based positioning.

At block 1002, the network entity transmits a TRP configuration. For example, the TRP configuration may include or correspond to TRP configuration 372, PRS configuration 381, MG configuration 382, PRS information 307, measurement gap information 308, tag device information 366 or 309, or a combination thereof. The TRP configuration may include or indicate first information associated with a first tag device, such as tag device 120. The first information may include or indicate a first position of the first tag device, a first training sequence for the first tag device, a first backscatter timeframe window for the first tag device, or a combination thereof. Additionally, or alternatively, the TRP configuration may include or indicate second information associated with a second tag device, such as second tag device 322. The second information may include or indicate a second position of a second tag device, a second training sequence for the second tag device, a second backscatter timeframe window for the second tag device, or a combination thereof. In some implementations, the first position, the second position, or both are estimated positions.

In some implementations, the first information includes or indicates a first preamble sequence and the second information includes or indicates a second preamble sequence. For example, the first preamble sequence and the second preamble sequence may be the same preamble sequence. In some implementations, the first information further includes or indicates a tag ID, a frequency shift parameter, a phase scrambling parameter, or a combination thereof.

At block 1004, the network entity receives a measurement report from a TRP. For example, the TRP may include or correspond to TRP 340. The measurement report may include or correspond to measurement report 378 or measurement information 310. The measurement report may include or indicate a first RTT of the first tag device, a second RTT of the second tag device, or a combination thereof. The first RTT may be based on the first information and the first backscatter signal from the first tag device, and the second RTT may be based on the second information and the second backscatter signal of the second tag device. The first backscatter signal may include or correspond to first backscatter signal 376. The second backscatter signal may include or correspond to second backscatter signal 384.

In some implementations, the TRP configuration indicates a first configuration for the first tag device and a second configuration for the second tag device. For example, the first configuration may include the first information and the second configuration may include the second information.

In some implementations, the network entity determines an RSSI or an RSRP associated with the first tag device. Additionally, the network entity may generate the first information based on the RSSI or the RSRP. In some implementations, the first position includes an estimated position of the first tag device. In some implementations, the network entity determines an updated position of the first tag device based on the first measurement report.

Figure 11:
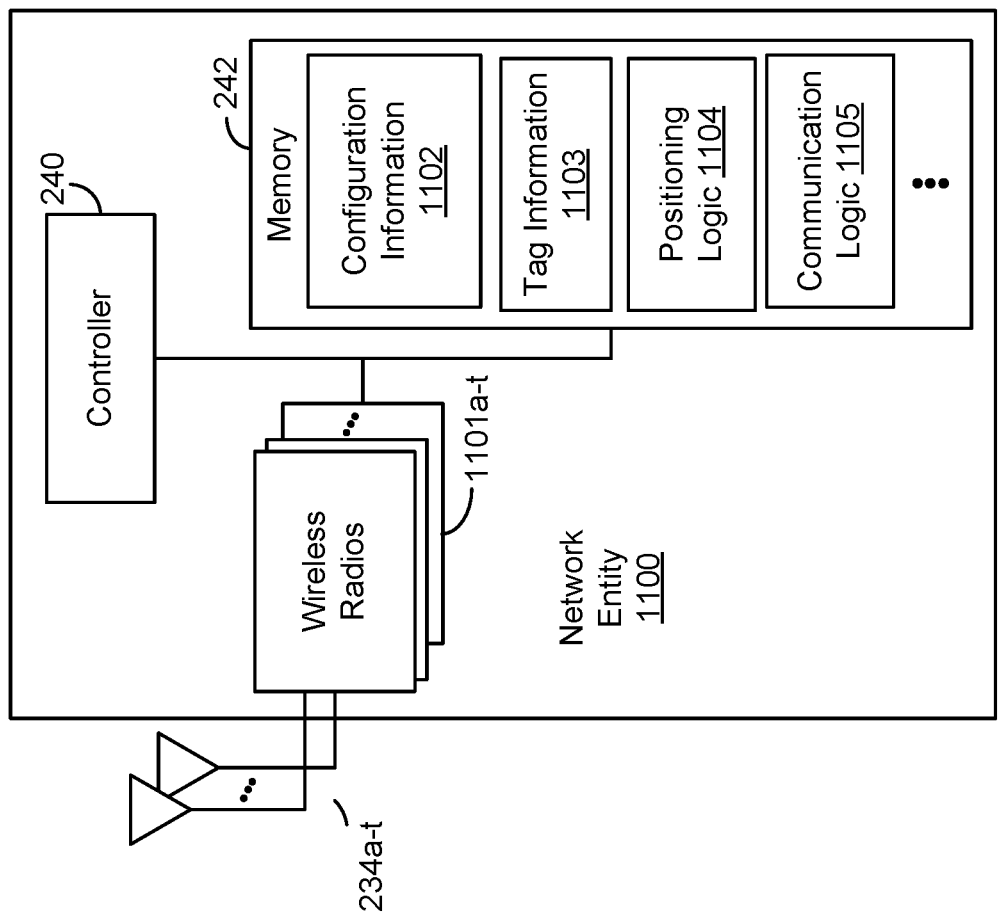
FIG. 11 is a block diagram of an example network entity that supports backscatter-based positioning according to one or more aspects.

FIG. 11 is a block diagram of an example network entity 1100 that supports backscatter-based positioning according to one or more aspects. Network entity 1100 may be configured to perform operations, including the blocks of process 1100 described with reference to FIGS. 9 and 10. In some implementations, network entity 1100 includes the structure, hardware, and components shown and described with reference to base station 105, UE 115, LMF 131, reader device 121, or TRP 340. For example, network entity 1100 may include controller 240, which operates to execute logic or computer instructions stored in memory 242, as well as controlling the components of network entity 1100 that provide the features and functionality of network entity 1100. Network entity 1100, under control of controller 240, is configured to transmit and receive signals via wireless radios 1101*a-t* and antennas 234*a-t*. Wireless radios 1101*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include tag information 1102, configuration logic 1103, positioning logic 1104, and communication logic 1105. Tag information 1102 may include or correspond to tag device information 309. Configuration information 1102 may be configured to generate one or more configurations or configuration data, such as TRP configuration 372, PRS configuration 381, MG configuration 382, a tag device configuration, or a combination thereof. Positioning logic 1104 may be configured to determine a position of a tag device, such as position 369 of tag device 120. Communication logic 1105 may be configured to enable communication between network entity 1100 and one or more other devices. Network entity 1100 may receive signals from or transmit signals to one or more other devices, such as UE 115, base station 105, tag device 120 or 322-325, reader device 121, core network 130, LMF 131, TRP 340, or a tag device as described with reference to FIG. 13.

FIG. 12 is a flow diagram illustrating an example process 1200 that supports backscatter-based positioning according to one or more aspects. Operations of process 1200 may be performed by a tag device, such as tag device 120 or 322-325, or a tag device described with reference to FIG. 13. For example, example operations (also referred to as "blocks") of process 1200 may enable the tag device to support backscatter-based positioning.

At block 1202, the tag device receives a tag configuration message that indicates multiple tag configurations. For example, the tag configuration message may include or correspond to tag configuration message 380 or tag device information 309 or 366.

At block 1204, the tag device receives a PRS. For example, the PRS may include or correspond to PRS 374 or PRS information 307.

At block 1206, the tag device transmits a backscatter signal based on the PRS and a first tag configuration of the multiple tag configurations. The backscatter signal may include or correspond to backscatter signal 376 or measurement information 310. The first tag configuration may include or indicate a first preamble sequence, a first training sequence, a first backscatter timeframe window, or a combination thereof.

In some implementations, the first tag configuration indicates a tag ID, a frequency shift parameter, a phase scrambling parameter, or a combination thereof. In some implementations, the tag device determines that the tag ID of the first tag configuration indicates the first tag device. Additionally, the tag device may select, based on the tag ID, the first tag configuration of the multiple tag configurations.

In some implementations, the tag device determines an RSSI or an RSRP of the PRS. Additionally, the tag device may select, based on the RSSI or the RSRP, the backscatter timeframe window from multiple backscatter timeframe window indicated by the tag configuration message. Further, the tag device backscatters the PRS based on the first backscatter timeframe window.

In some implementations, the multiple tag configurations include the first tag configuration for the first tag device and a second tag configuration for the second tag device. For example, the first tag configuration may indicate a first frequency shift parameter, a first phase scrambling parameter, the first preamble sequence, the first training sequence, the first backscatter timeframe window, or a combination thereof. As another example, the second tag configuration indicates a second frequency shift parameter, a second phase scrambling parameter, a second preamble sequence, a second training sequence, a second backscatter timeframe window, or a combination thereof.

In some implementations, the first preamble sequence and the second preamble sequence are the same sequence, and the first training sequence is distinct from the second training sequence. In some implementations, the first tag device and the second tag device are within a threshold range (e.g., 606) of a TRP. In some implementations, the first tag device is with a first threshold range of a TRP, the second tag device is within a second threshold range of the TRP, and the first threshold range is different from and non-overlapping with the second threshold range.

FIG. 13 is a block diagram of an example tag device 1300 that supports backscatter-based positioning according to one or more aspects. Tag device 1300 may include or correspond to tag device 130, to tag devices 322-325, or a combination thereof. For example, tag device 1300 may include an RFID or IoT device. Additionally, or alternatively, tag device may include a passive device, a semi-passive device, or an active device.

Tag device 1300 may be configured to perform operations, including the blocks of a process described with reference to FIG. 12. In some implementations, tag device 1300 includes the structure, hardware, and components shown and described with reference to tag device 130. For example, tag device 1300 includes controller 1380, which operates to execute logic or computer instructions stored in memory 1382, as well as controlling the components of tag device 1300 that provide the features and functionality of tag device 1300. Controller 1380 and memory 1382 may include or correspond to circuitry 351. Tag device 1300, under control of controller 1380, is configured to transmit and receive signals via wireless radio 1301 and antenna 1352. In some implementations, wireless radio 1301 and antenna 1352 may include or correspond to transmitter 356, receiver 358, or a combination thereof. Wireless radio 1301 includes various components and hardware. As an illustrative, non-limiting example, tag device 1300 may include, as described with reference to FIG. 2, modulator and demodulators 254a-r, MIMO detector 256, receive processor 258, transmit processor 264, and TX MIMO processor 266.

Tag device 1300 also includes energy harvesting circuitry 1390. Energy harvesting circuitry 1390 may include or correspond to circuitry 351. Energy harvesting circuitry 1390 may include hardware (e.g., circuitry), software, or a combination thereof configured to harvest energy from an energy source for tag device 1300. For example, the energy source may include a solar energy source, a vibrational energy source, a thermal energy source, or an RF energy source, as illustrative, non-limiting examples. Energy harvesting circuitry 1390 may be coupled to circuitry, such as controller 1380, memory 1382, wireless radio 1301, a power source of tag device 1300, or a combination thereof. In some implementations, the harvested energy may be used to charge a power source, such as a battery or capacitor. The power source may be coupled to controller 1380, memory 1382, wireless radio 1301, or a combination thereof. Additionally, or alternatively, the harvested energy may be configured to power one or more components of tag device 1300.

As shown, memory 1382 may include tag capability information 1302, tag configuration information 1303, and communication logic 1304. Tag capability information 1302 may include or correspond to tag device information 309. Tag configuration information 1303 may correspond to a tag configuration. Communication logic 1304 may be configured to enable communication between tag device 1300 and one or more other devices. Tag device 1300 may be configured to receive signals from or transmit signals to one or more network entities, base station 105, UE 115, reader device 121, core network 130, LMF 131, TRP 340, or a network entity as illustrated in FIG. 11.

It is noted that tag device 1300 may include fewer or more components than described with respect to FIG. 13. For example, in some implementations, tag device 1300 may include a power storage device. As another example, tag device 1300 may not include controller 1380.

It is noted that one or more blocks (or operations) described with reference to FIG. 9, 10, or 12 may be combined with one or more blocks (or operations) described with reference to another of the figures. For example, one or more blocks (or operations) of FIG. 9 may be combined with one or more blocks (or operations) of FIG. 10. As another example, one or more blocks of FIG. 9 may be combined with one or more blocks (or operations) of FIG. 12. As another example, one or more blocks of FIG. 10 may be combined with one or more blocks (or operations) of FIG. 12. As another example, one or more blocks of FIG. 9, 10, or 12 may be combined with one or more blocks (or operations) of FIGS. 4-7. As another example, one or more blocks (or operations) associated with FIG. 9, 10, or 12 may be combined with one or more blocks associated with FIGS. 1-3. Additionally, or alternatively, one or more operations described above with reference to FIGS. 1-7 may be combined with one or more operations described with reference to FIG. 11 or 13.

In one or more aspects, techniques for supporting backscatter-based positioning may include additional aspects, such as any single aspect or any combination of aspects described below or in connection with one or more other processes or devices described elsewhere herein. In a first aspect, techniques for supporting backscatter-based positioning may include transmitting a tag configuration message that indicates a first tag configuration for a first tag device and a second tag configuration for a second tag device, and transmitting a PRS. The techniques may further include receiving, from the first tag device, a first backscatter signal based on the PRS, and receiving, from the second tag device, a second backscatter signal based on the PRS. The techniques may also include transmitting a measurement report that indicates a first RTT of the first tag device, and a second RTT of the second tag device. The first RTT may be based on the first configuration and the first backscatter signal, and the second RTT may be based on the second configuration and the second backscatter signal. In some examples, the techniques in the first aspect may be implemented in a method or process. In some other examples, the techniques of the first aspect may be implemented in a wireless communication device, such as a TRP, which may include a network entity, a base station, a reader device, a UE, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the tag configuration message indicates a tag address, a frequency shift parameter, a phase scrambling parameter, a preamble sequence, a training sequence, a backscatter timeframe window, or a combination thereof.

In a third aspect, in combination with the first aspect, the first tag configuration indicates a first frequency shift parameter, a first phase scrambling parameter, a first preamble sequence, a first training sequence, a first backscatter timeframe window, or a combination thereof.

In a fourth aspect, in combination with the third aspect, the second tag configuration indicates a second frequency shift parameter, a second phase scrambling parameter, a second preamble sequence, a second training sequence, a second backscatter timeframe window, or a combination thereof.

In a fifth aspect in combination with the fourth aspect, the first preamble sequence and the second preamble sequence are the same sequence, and the first training sequence is distinct from the second training sequence.

In a sixth aspect, in combination with the fourth aspect, the first preamble sequence and the second preamble sequence are the same sequence.

In a seventh aspect, in combination with the fourth aspect, the first training sequence and the second training sequence are the same training sequence.

In an eighth aspect, in combination with the fourth aspect, the first tag device is a first estimated distance from the TRP, the second tag device is a second estimated distance from the TRP, or a combination thereof.

In a ninth aspect, in combination with the eighth aspect, the first distance is a first estimated distance, the second tag distance is a second estimated distance, or a combination thereof.

In a tenth aspect, in combination with the eighth aspect, the techniques further include receiving a TRP configuration that indicates the first distanced, the second distance, or a combination thereof.

In an eleventh aspect, in combination with the eighth aspect, determining the first distance based on a first RSSI/RSRP indicator corresponding to the first backscatter signal.

In a twelfth aspect, in combination with the eleventh aspect, the techniques further include determining the second distance based on a second RSSI/RSPR indicator corresponding to the second backscatter signal.

In a thirteenth aspect, in combination with the eighth aspect, the first distance is greater than the second estimated distance.

In a fourteenth aspect, in combination with the thirteenth aspect, the first backscatter timeframe window is greater than the second backscatter timeframe window.

In a fifteenth aspect, in combination with the eighth aspect, the first distance and the estimated distance are within a threshold range from the TRP.

In a sixteenth aspect, in combination with the sixteenth aspect, the first preamble sequence and the second preamble sequence are the same sequence.

In a seventeenth aspect, in combination with the sixteenth aspect, the techniques further include determining a backscatter channel gain for the first tag device based on the first preamble sequence and a first portion of the first backscatter signal.

In an eighteenth aspect, in combination with the sixteenth aspect, the first training sequence is distinct from the second training sequence.

In a nineteenth aspect, in combination with the eighteenth aspect, the techniques further include determining a first backscatter signal gain associated with the first tag device based on the first training sequence, the first preamble sequence, the first backscatter signal, or a combination thereof.

In a twentieth aspect, in combination with the nineteenth aspect, the techniques further include determining a second backscatter signal gain associated with the second tag device based on the second training sequence, the second preamble sequence, the second backscatter signal, or a combination thereof.

In a twenty-first aspect, in combination with the eighth aspect, the tag configuration message indicates a third tag configuration for a third tag device, a fourth tag configuration for a fourth tag device, or a combination thereof.

In a twenty-second aspect, in combination with one or more of the first aspect through the twenty-first aspect, the techniques further include receiving, from a third tag device, a third backscatter signal based on the PRS.

In a twenty-third aspect, in combination with the twenty-second aspect, the techniques further include receiving, from a fourth tag device, a fourth backscatter signal based on the PRS.

In a twenty-fourth aspect, in combination with the twenty-third aspect, the third tag device is a third distance from the TRP, and the fourth tag device is a fourth distance from the TRP.

In a twenty-fifth aspect, in combination with the twenty-fourth aspect, the techniques further include allocating the first tag device and the third tag device to a first group based on the first distance and the third distance.

In a twenty-sixth aspect, in combination with the twenty-fifth aspect, the techniques further include allocating the second tag device and the fourth tag device to a second group based on the second distance and the fourth distance.

In a twenty-seventh aspect, in combination with the twenty-fourth aspect, the first distance and the third distance are within a first threshold range of the TRP.

In a twenty-eighth aspect, in combination with the twenty-seventh aspect, the second distance and the fourth distance are within a second threshold range of the TRP that is different from and non-overlapping with the first threshold range.

In a twenty-ninth aspect, in combination with the twenty-eighth aspect, the third tag configuration indicates a third training sequence distinct from the first training sequence; the fourth tag configuration indicates a fourth training sequence distinct from the second training sequence; or a combination thereof.

In a thirtieth aspect, in combination with the twenty-eighth aspect, the techniques further include determining a first backscatter signal gain associated with the first tag device based on the first training sequence, the first preamble sequence, and the first backscatter signal.

In a thirty-first aspect, in combination with the thirtieth aspect, the techniques further include determining a third backscatter signal gain associated with the third tag device based on the third training sequence, based on a third preamble sequence, and the third backscatter signal.

In a thirty-second aspect, in combination with the thirty-first aspect, the first preamble sequence and the third preamble sequence are the same preamble sequence.

In one or more aspects, techniques for supporting backscatter-based positioning may include additional aspects, such as any single aspect or any combination of aspects described below or in connection with one or more other processes or devices described elsewhere herein. In a thirty-third aspect, techniques for supporting backscatter-based positioning may include transmitting a TRP configuration that indicates first information associated with a first tag device, and second information associated with a second tag device. The first information includes or indicates a first position of the first tag device, a first training sequence for the first tag device, a first backscatter timeframe window for the first tag device, or a combination thereof. The second information includes or indicates a second position of a second tag device, a first training sequence for the first tag device, a first backscatter timeframe window for the first tag device, or a combination thereof. The techniques may further include receives, from a TRP, a measurement report that indicates a first RTT, and a second RTT. The first RTT is based on the first information and a first backscatter signal, and the second RTT is based on the second information and the second backscatter signal. In some examples, the techniques in the thirty-third aspect may be implemented in a method or process. In some other examples, the techniques of the thirty-third aspect may be implemented in a communication device or a communication system. For example, the communication device may include wireless communication device, such as a network entity, a core network, an LMF, a UE, a base station, a reader device, a TRP, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a thirty-fourth aspect, in combination with the thirty-third aspect, the first information indicates a first preamble sequence and the second preamble indicates a second preamble sequence.

In a thirty-fifth aspect, in combination with the thirty-third aspect through the thirty-fourth aspect, the first preamble sequence and the second preamble sequence are the same preamble sequence.

In a thirty-sixth aspect, in combination with one or more of the thirty-third aspect through the thirty-fifth aspect, the first information further indicates a tag ID, a frequency shift parameter, a phase scrambling parameter, or a combination thereof.

In a thirty-seventh aspect, in combination with one or more of the thirty-third aspect through the thirty-sixth aspect, the TRP configuration indicates a first configuration for the first tag device and a second configuration for the second tag device.

In a thirty-eighth aspect, in combination with the thirty-seventh aspect, the first configuration includes the first information and the second configuration includes the second information.

In a thirty-ninth aspect, in combination with one or more of the thirty-third aspect through the thirty-eighth aspect, the techniques further include determining an RSSI or an RSRP associated with the first tag device, and generating the first information based on the RSSI or the RSRP.

In a fortieth aspect, in combination with one or more of the thirty-third aspect through the thirty-ninth aspect, the first position includes an estimated position of the first tag device.

In a forty-first aspect, in combination with one or more of the thirty-third aspect through the fortieth aspect, the techniques further include determining an updated position of the first tag device based on the first measurement report.

In one or more aspects, techniques for supporting backscatter-based positioning may include additional aspects, such as any single aspect or any combination of aspects described below or in connection with one or more other processes or devices described elsewhere herein. In a forty-second aspect, techniques for supporting backscatter-based positioning may include receiving a tag configuration message that includes or indicates multiple tag configurations, and receiving a PRS. The techniques may further include transmitting a backscatter signal based on the PRS and a first tag configuration of the multiple tag configurations. The first tag configurations includes or indicates a first preamble sequence, a first training sequence, a first backscatter timeframe window, or a combination thereof. In some examples, the techniques in the forty-second aspect may be implemented in a method or process. In some other examples, the techniques of the forty-second aspect may be implemented in a wireless communication device, such as a tag device or IoT device, which may include a passive tag, a semi-passive tag, an active tag, a UE, an RFID, or a component thereof. In some examples, the wireless communication device may include circuitry, such as at least one processing unit or system (which may include an application processor, a modem or other components) and at least one memory device coupled to the processing unit, as illustrative, non-limiting examples. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a forty-third aspect, in combination with the forty-second aspect the first tag configuration indicates a tag ID, a frequency shift parameter, a phase scrambling parameter, or a combination thereof.

In a forty-fourth aspect, in combination with the forty-third aspect, the techniques further include determining that the tag ID of the first tag configuration indicates the first tag device.

In a forty-fifth aspect, in combination with the forty-fourth aspect, the techniques further include selecting, based on the tag ID, the first tag configuration of the multiple tag configurations.

In a forty-sixth aspect, in combination with the forty-third aspect, the techniques further include determining an RSSI or an RSRP of the PRS.

In a forty-seventh aspect, in combination with the forty-sixth aspect, the techniques further include selecting, based on the RSSI or the RSRP, the backscatter timeframe window from multiple backscatter timeframe window indicated by the tag configuration message.

In a forty-eighth aspect, in combination with the forty-seventh aspect, the techniques further include backscattering the PRS based on the first backscatter timeframe window.

In a forty-ninth aspect, in combination with the forty-second aspect the multiple tag configurations include the first tag configuration for the first tag device and a second tag configuration for the second tag device.

In a fiftieth aspect, in combination with the forty-ninth aspect, the first tag configuration indicates a first frequency shift parameter, a first phase scrambling parameter, the first preamble sequence, the first training sequence, the first backscatter timeframe window, or a combination thereof.

In a fifty-first aspect, in combination with the fiftieth aspect, the second tag configuration indicates a second frequency shift parameter, a second phase scrambling parameter, a second preamble sequence, a second training sequence, a second backscatter timeframe window, or a combination thereof.

In a fifty-second aspect, in combination with the fifty-first aspect, the first preamble sequence and the second preamble sequence are the same sequence, and the first training sequence is distinct from the second training sequence.

In a fifty-third aspect, in combination with the forty-ninth aspect, the first tag device and the second tag device are within a threshold range of a TRP.

In a fifty-fourth aspect, in combination with the forty-ninth aspect, the first tag device is with a first threshold range of a TRP.

In a fifty-fifth aspect, in combination with the fifty-fourth aspect, the second tag device is within a second threshold range of the TRP.

In a fifty-sixth aspect, in combination with the fifty-fifth aspect, the first threshold range is different from and non-overlapping with the second threshold range.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes .1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a transmission/reception point (TRP), the method comprising:
    transmitting a tag configuration message that indicates a first tag configuration and a second tag configuration, wherein the first tag configuration is based at least in part on a distance between the TRP and a first tag device and the second tag configuration is based at least in part on a distance between the TRP and a second tag device;
    transmitting a positioning reference signal (PRS);
    receiving, from the first tag device, a first backscatter signal based on the PRS and the first tag configuration;
    receiving, from the second tag device, a second backscatter signal based on the PRS and the second tag configuration; and
    transmitting a measurement report that indicates:
        a first round trip time (RTT), based on the first tag configuration and the first backscatter signal, of the first tag device, and
        a second RTT, based on the second tag configuration and the second backscatter signal, of the second tag device.

2. The method of claim 1, wherein the tag configuration message indicates a tag address, a frequency shift parameter, a phase scrambling parameter, a preamble sequence, a training sequence, a backscatter timeframe window, or a combination there of.

3. The method of claim 1, wherein:
    the tag configuration message includes a threshold to enable the first tag device to select one of the first tag configuration or the second tag configuration based on a first received signal strength indicator (RSSI)/reference signal received power (RSRP) indicator of the PRS.

4. The method of claim 1, wherein:
the first tag configuration indicates a first frequency shift parameter, a first phase scrambling parameter, a first preamble sequence, a first training sequence, a first backscatter timeframe window, or a combination thereof;
the second tag configuration indicates a second frequency shift parameter, a second phase scrambling parameter, a second preamble sequence, a second training sequence, a second backscatter timeframe window, or a combination thereof; or
a combination thereof.

5. The method of claim 4, wherein:
the first tag device is a first distance from the TRP;
the second tag device is a second distance from the TRP;
the first distance is greater than the second distance;
the first backscatter timeframe window is longer than the second backscatter timeframe window; and
a first duration of the first backscatter signal is greater than a second duration of the second backscatter signal.

6. The method of claim 4, wherein:
the first preamble sequence and the second preamble sequence are the same sequence, and
the first training sequence is distinct from the second training sequence.

7. The method of claim 6, further comprising:
determining a first backscatter channel gain for the first tag device based on the first preamble sequence, the first training sequence, and a first portion of the first backscatter signal;
determining the first RTT based on the first backscatter channel gain and the first backscatter signal;
determining a second backscatter channel gain associated with the second tag device based on the second training sequence, the second preamble sequence, the second backscatter signal, or a combination thereof; and
determining the second RTT based on the second backscatter channel gain and the second backscatter signal.

8. The method of claim 1, further comprising:
receiving a TRP configuration that indicates a first distance, a second distance, or a combination thereof, and wherein:
the first tag device is a first distance from the TRP, or the second tag device is a second distance from the TRP.

9. The method of claim 8, wherein:
the first distance is a first estimated distance;
the second distance is a second estimated distance; or
a combination thereof.

10. The method of claim 1, wherein:
the first tag device is a first distance from the TRP;
the second tag device is a second distance from the TRP;
a third tag device is a third distance from the TRP;
a fourth tag device is a fourth distance from the TRP;
the first distance and the third distance are within a first threshold range of the TRP; and
the second distance and the fourth distance are within a second threshold range of the TRP that is different from and non-overlapping with the first threshold range.

11. The method of claim 10, further comprising:
allocating the first tag device and the third tag device to a first group based on the first distance and the third distance, the first group associated with a first backscatter timeframe window; and
allocating the second tag device and the fourth tag device to a second group based on the second distance and the fourth distance, the second group associated with a second backscatter timeframe window;
receiving, from the third tag device, a third backscatter signal based on the PRS; and
receiving, from the fourth tag device, a second backscatter signal based on the PRS.

12. A transmission/reception point (TRP) comprising:
a memory storing processor-readable code; and
at least one processor coupled to the memory, the at least one processor configured to execute the processor-readable code to cause the at least one processor to:
transmit a tag configuration message that indicates a first tag configuration and a second tag configuration, wherein the first tag configuration is based at least in part on a distance between the TRP and a first tag device and the second tag configuration is based at least in part on a distance between the TRP and a second tag device;
transmit a positioning reference signal (PRS);
receive, from the first tag device, a first backscatter signal based on the PRS and the first tag configuration;
receive, from the second tag device, a second backscatter signal based on the PRS and the second tag configuration; and
transmit a measurement report that indicates:
a first round trip time (RTT), based on the first tag configuration and the first backscatter signal, of the first tag device, and
a second RTT, based on the second tag configuration and the second backscatter signal, of the second tag device.

13. The TRP of claim 12, wherein the tag configuration message indicates a tag address, a frequency shift parameter, a phase scrambling parameter, a preamble sequence, a training sequence, a backscatter timeframe window, or a combination thereof.

14. The TRP of claim 12, wherein the tag configuration message includes a threshold to enable the first tag device to select one of the first tag configuration or the second tag configuration based on a first received signal strength indicator (RSSI) or a reference signal received power (RSRP) determined based on the PRS.

15. The TRP of claim 12, wherein:
the at least one processor is further configured to execute the processor-readable code to cause the at least one processor to receive a TRP configuration that indicates a first distance, a second distance, or a combination thereof; and
the first tag device is a first distance from the TRP; or
the second tag device is a second distance from the TRP.

16. The TRP of claim 12, wherein:
the first tag configuration indicates a first frequency shift parameter, a first phase scrambling parameter, a first preamble sequence, a first training sequence, a first backscatter timeframe window, or a combination thereof;
the second tag configuration indicates a second frequency shift parameter, a second phase scrambling parameter, a second preamble sequence, a second training sequence, a second backscatter timeframe window, or a combination thereof; or
a combination thereof.

17. The TRP of claim 16, wherein:
the at least one processor is further configured to execute the processor-readable code to cause the at least one processor to
- determine a first backscatter channel gain for the first tag device based on the first preamble sequence, the first training sequence, and a first portion of the first backscatter signal;
- determine the first RTT based on the first backscatter channel gain and the first backscatter signal;
- determine a second backscatter channel gain associated with the second tag device based on the second training sequence, the second preamble sequence, the second backscatter signal, or a combination thereof; and
- determine the second RTT based on the second backscatter channel gain and the second backscatter signal;

the first preamble sequence and the second preamble sequence are the same sequence; and
the first training sequence is distinct from the second training sequence.

18. The TRP of claim 16, wherein:
the first tag device is a first distance from the TRP;
the second tag device is a second distance from the TRP;
the first distance is greater than the second distance;
the first backscatter timeframe window is longer than the second backscatter timeframe window; and
a first duration of the first backscatter signal is greater than a second duration of the second backscatter signal.

\* \* \* \* \*